US012443966B2

(12) United States Patent
Manivannan et al.

(10) Patent No.: US 12,443,966 B2
(45) Date of Patent: Oct. 14, 2025

(54) DISTRIBUTED TRACING TECHNIQUES FOR ACQUIRING BUSINESS INSIGHTS

(71) Applicant: Ally Financial Inc., Detroit, MI (US)

(72) Inventors: Premkumar Manivannan, Phoenix, AZ (US); Patrick Vondette, Detroit, MI (US); Timothy Edwards, Charlotte, NC (US); Spencer Cremers, Detroit, MI (US)

(73) Assignee: Ally Financial Inc., Detroit, MI (US)

( * ) Notice: Subject to any disclaimer, the term of this patent is extended or adjusted under 35 U.S.C. 154(b) by 140 days.

(21) Appl. No.: 17/342,735

(22) Filed: Jun. 9, 2021

(65) Prior Publication Data

US 2022/0398603 A1     Dec. 15, 2022

(51) Int. Cl.
 *G06Q 30/0201* (2023.01)
 *G06F 16/23* (2019.01)
 *G06F 16/28* (2019.01)
 *G06Q 10/0639* (2023.01)
 (Continued)

(52) U.S. Cl.
 CPC ..... *G06Q 30/0201* (2013.01); *G06F 16/2379* (2019.01); *G06F 16/284* (2019.01); *G06Q 10/06393* (2013.01); *G06Q 30/016* (2013.01); *G06Q 40/02* (2013.01)

(58) Field of Classification Search
 USPC ...................................................... 705/7.29
 See application file for complete search history.

(56) References Cited

U.S. PATENT DOCUMENTS

| 7,200,588 | B1* | 4/2007 | Srivastava | ............ | G06F 16/284 |
| | | | | | 707/999.102 |
| 9,928,517 | B1* | 3/2018 | Hitchcock | .......... | G06Q 30/0201 |
| 11,347,625 | B1* | 5/2022 | Agarwal | ............... | G06F 16/245 |
| (Continued) | | | | | |

FOREIGN PATENT DOCUMENTS

KR         101791623 B1 * 10/2017

OTHER PUBLICATIONS

Openzipkin. (Sep. 13, 2020). Openzipkin/B3-propagation: Repository that describes and sometimes implements B3 propagation. GitHub. https://github.com/openzipkin/b3-propagation (Year: 2020).*

(Continued)

*Primary Examiner* — Kristin E Gavin
(74) *Attorney, Agent, or Firm* — Holland & Hart LLP

(57) ABSTRACT

Methods, systems, and devices are described. A user journey may be initiated by a user device, and a trace may be generated for the user journey. The trace may include one or more spans that each correspond to at least one service of a set of services that provide functionality to the user journey (e.g., as components of an application). Based on the generated trace including the one or more spans, both diagnostic information and user-specific transaction information may be collected for the user journey. For example, the diagnostic information may include information associated with a service (e.g., how long the service took to complete) and the user-specific transaction information may include information related to the user, such as a location of the user, a type of device used for a transaction, among other examples. The diagnostic information and user-specific transaction information may be stored and processed by a system.

18 Claims, 12 Drawing Sheets

(51) Int. Cl.
*G06Q 30/016* (2023.01)
*G06Q 40/02* (2023.01)

(56) References Cited

U.S. PATENT DOCUMENTS

| | | | | |
|---|---|---|---|---|
| 2013/0246300 A1* | 9/2013 | Fischer | ............... | G06Q 30/0206 |
| | | | | 705/347 |
| 2014/0108463 A1* | 4/2014 | Gagliardi | ............ | G06F 11/3495 |
| | | | | 707/E17.044 |
| 2015/0161623 A1* | 6/2015 | Rahman | ............. | G06Q 30/0201 |
| | | | | 705/7.29 |
| 2015/0212925 A1* | 7/2015 | Granshaw | ........... | G06F 11/3636 |
| | | | | 717/128 |
| 2017/0323345 A1* | 11/2017 | Flowers | ......... | G06Q 10/063112 |
| 2017/0364543 A1* | 12/2017 | Gupta | .................. | G06F 11/2094 |
| 2018/0039667 A1* | 2/2018 | Pierce | ................. | G06F 16/2379 |
| 2018/0218023 A1* | 8/2018 | Fanghaenel | ......... | G06F 16/2343 |
| 2018/0246920 A1* | 8/2018 | Nguyen | ............... | G06F 16/2282 |
| 2018/0260227 A1* | 9/2018 | Williams | ............... | G06F 9/3858 |
| 2018/0324242 A1* | 11/2018 | Terry | .................... | G06Q 30/02 |
| 2019/0079998 A1* | 3/2019 | Rush | ...................... | G06F 16/335 |
| 2020/0257680 A1* | 8/2020 | Danyi | .................. | G06F 16/245 |
| 2021/0227351 A1* | 7/2021 | Mei | ......................... | H04L 67/14 |
| 2022/0083452 A1* | 3/2022 | Cirone | ................ | G06F 11/3476 |

OTHER PUBLICATIONS

Zhang, Dan, Fei Wang, and Luo Si. "Composite hashing with multiple information sources." Proceedings of the 34th international ACM SIGIR conference on Research and development in Information Retrieval. 2011. (Year: 2011).*

Sigelman, Benjamin H., et al. "Dapper, a large-scale distributed systems tracing infrastructure." (2010). (Year: 2010).*

* cited by examiner

DISTRIBUTED TRACING TECHNIQUES FOR ACQUIRING BUSINESS INSIGHTS

FIELD OF TECHNOLOGY

The present disclosure relates generally to distributed systems and data processing, and more specifically to distributed tracing techniques for acquiring business insights.

BACKGROUND

Service-based and microservices architectures may be employed for storing, managing, and processing data using a network of remote devices and servers. In such cases, an application may include a number of distributed services that each represent some component functionality of the application. Each service may be implemented using one or more respective databases, hardware components, software components, programming languages, or any combination thereof, and respective services may communicate over a network (e.g., using some protocol) such that various services may be deployed independently from one another yet remain coupled to other services. An application deployed using microservices or a service-based architecture may provide functionality to user devices (e.g., desktop computers, laptops, smartphones, tablets, or other computing systems) for different operations, functions, programs, and services. In one example, an application may support financial transactions and functions including, for example, account access, investment services, banking transactions, purchasing/selling products (e.g., vehicles), or the like. In some examples, a microservices architecture may be associated with a distributed system that includes multiple groups of machines performing various tasks in a coordinated fashion to process data flowing through the system. While these architectures may provide various efficiencies in terms of modifying, updating, and scaling an application, using multiple interconnected services may also add complexity to the identification of problems or issues that may occur at the various services of the application, particularly with respect to understanding a user's journey associated with such applications.

SUMMARY

The described techniques relate to improved methods, systems, devices, and apparatuses that support distributed tracing techniques for acquiring business insights. Generally, the described techniques provide for efficient collection of user and business-related transaction information for multiple services, while simultaneously collecting records of events that occur for a particular user request. In such cases, the user and business transaction information, as well as the event records, may be acquired for a user journey using a same technique when generating a trace, and the information may be used to provide various insights into improving a user experience when using an application. In particular, a trace may be generated for a user journey that is initiated by a user device (e.g., a mobile device, a personal computer). The journey may be initiated by the source device via an application that is based on a microservices architecture or service-based architecture, where respective journeys may be associated with, for example, a user creating a new account (e.g., creating a savings account, creating an investment account), transferring funds between accounts, or logging into an account via a web-based or mobile application, among other examples.

The trace generated for the journey may include one or more spans, and each span may correspond to at least one service of a set of services that provide functionality to the user journey (e.g., as respective components of the application). Based on the generated trace including the one or more spans, both diagnostic information and user-specific transaction information may be collected for the user journey. For example, the diagnostic information may include information associated with a service (e.g., how long the service took to complete) and the user-specific transaction information may include information related to the user and/or the transaction for that particular service, such as a location of the user, a type of device used for a transaction (e.g., transferring funds), a type of transaction, among other examples. The diagnostic information and user-specific transaction information may be stored and processed by a system, providing efficient acquisition and improved availability of user-specific information that is coupled with diagnostic information for a user journey, resulting in robust business insights into a user's experience with an application.

A method is described. The method may include generating, for a user journey initiated by a source device, trace data for one or more spans corresponding to respective portions of the user journey, wherein each span of the one or more spans is associated with a respective service of a plurality of services, collecting diagnostic information and user-specific transaction information associated with the user journey based at least in part on the trace data, wherein the diagnostic information and the user-specific transaction information is collected for each service of the plurality of services, and storing the diagnostic information and the user-specific transaction information based at least in part on generating the trace data for the user journey.

An apparatus is described. The apparatus may include a processor, memory coupled with the processor, and instructions stored in the memory. The instructions may be executable by the processor to cause the apparatus to generate, for a user journey initiated by a source device, trace data for one or more spans corresponding to respective portions of the user journey, wherein each span of the one or more spans is associated with a respective service of a plurality of services, collect diagnostic information and user-specific transaction information associated with the user journey based at least in part on the trace data, wherein the diagnostic information and the user-specific transaction information is collected for each service of the plurality of services, and store the diagnostic information and the user-specific transaction information based at least in part on generating the trace data for the user journey.

Another apparatus is described. The apparatus may include means for generating, for a user journey initiated by a source device, trace data for one or more spans corresponding to respective portions of the user journey, wherein each span of the one or more spans is associated with a respective service of a plurality of services, means for collecting diagnostic information and user-specific transaction information associated with the user journey based at least in part on the trace data, wherein the diagnostic information and the user-specific transaction information is collected for each service of the plurality of services, and means for storing the diagnostic information and the user-specific transaction information based at least in part on generating the trace data for the user journey.

A non-transitory computer-readable medium storing code is described. The code may include instructions executable by a processor to generate, for a user journey initiated by a source device, trace data for one or more spans corresponding to respective portions of the user journey, wherein each span of the one or more spans is associated with a respective service of a plurality of services, collect diagnostic information and user-specific transaction information associated with the user journey based at least in part on the trace data, wherein the diagnostic information and the user-specific transaction information is collected for each service of the plurality of services, and store the diagnostic information and the user-specific transaction information based at least in part on generating the trace data for the user journey.

In some examples of the method, apparatuses, and non-transitory computer-readable medium described herein, collecting the diagnostic information and the user-specific transaction information may include operations, features, means, or instructions for collecting the diagnostic information and the user-specific transaction information based at least in part on one or more code wrappers applied to a distributed tracing system, the one or more code wrappers being configured to collect at least the user-specific transaction information for the plurality of services.

In some examples of the method, apparatuses, and non-transitory computer-readable medium described herein, generating the trace data may include operations, features, means, or instructions for generating trace context information for the one or more spans, the trace context information associated with the diagnostic information and the user-specific transaction information.

Some examples of the method, apparatuses, and non-transitory computer-readable medium described herein may further include operations, features, means, or instructions for identifying, using the trace context information, one or more unsuccessful processes of the user journey based at least in part on the user-specific transaction information.

Some examples of the method, apparatuses, and non-transitory computer-readable medium described herein may further include operations, features, means, or instructions for identifying, using the trace context information, one or more successful processes of the user journey based at least in part on the user-specific transaction information.

Some examples of the method, apparatuses, and non-transitory computer-readable medium described herein may further include operations, features, means, or instructions for propagating the trace context information across the plurality of services based at least in part on one or more trace headers, wherein the trace context information may be propagated in accordance with a B3 propagation scheme.

Some examples of the method, apparatuses, and non-transitory computer-readable medium described herein may further include operations, features, means, or instructions for generating one or more logs for the user-specific transaction information of the user journey, wherein the each log of the one or more logs correspond to a set of transactions occurring at a point in time and generating one or more tags for the user-specific transaction information of the user journey, wherein each tag of the one or more tags may be associated with a respective log of the one or more logs using key value pairing.

Some examples of the method, apparatuses, and non-transitory computer-readable medium described herein may further include operations, features, means, or instructions for storing the one or more logs in a first database comprising raw data storage and storing the one or more tags in a second database different than the first database, wherein the second database comprises a relational database.

Some examples of the method, apparatuses, and non-transitory computer-readable medium described herein may further include operations, features, means, or instructions for identifying a set of metrics associated with at least one service of the plurality of services, wherein the set of metrics comprises one or more threshold values corresponding to a service level objective, a service level indicator, a service level agreement, or any combination thereof and generating journey information for the user journey based at least in part on the diagnostic information, the user-specific transaction information, and the set of metrics.

In some examples of the method, apparatuses, and non-transitory computer-readable medium described herein, the set of metrics includes one or more predetermined values, one or more measurements over a time period, or any combination thereof.

Some examples of the method, apparatuses, and non-transitory computer-readable medium described herein may further include operations, features, means, or instructions for storing the trace data in a columnar database based at least in part on generating the trace data.

Some examples of the method, apparatuses, and non-transitory computer-readable medium described herein may further include operations, features, means, or instructions for generating a visualization of the user journey based at least in part on the trace data, one or more logs for the user-specific transaction information, and a set of metrics associated with at least one service of the plurality of services for the user journey, wherein the visualization may be generated based at least in part on a transaction type, or a portion of the user journey, or any combination thereof.

In some examples of the method, apparatuses, and non-transitory computer-readable medium described herein, the user-specific transaction information comprises a location of the source device, a type of transaction, a type of request, a type of the source device, user account information, a user classification, or any combination thereof.

DETAILED DESCRIPTION

Figure 1:
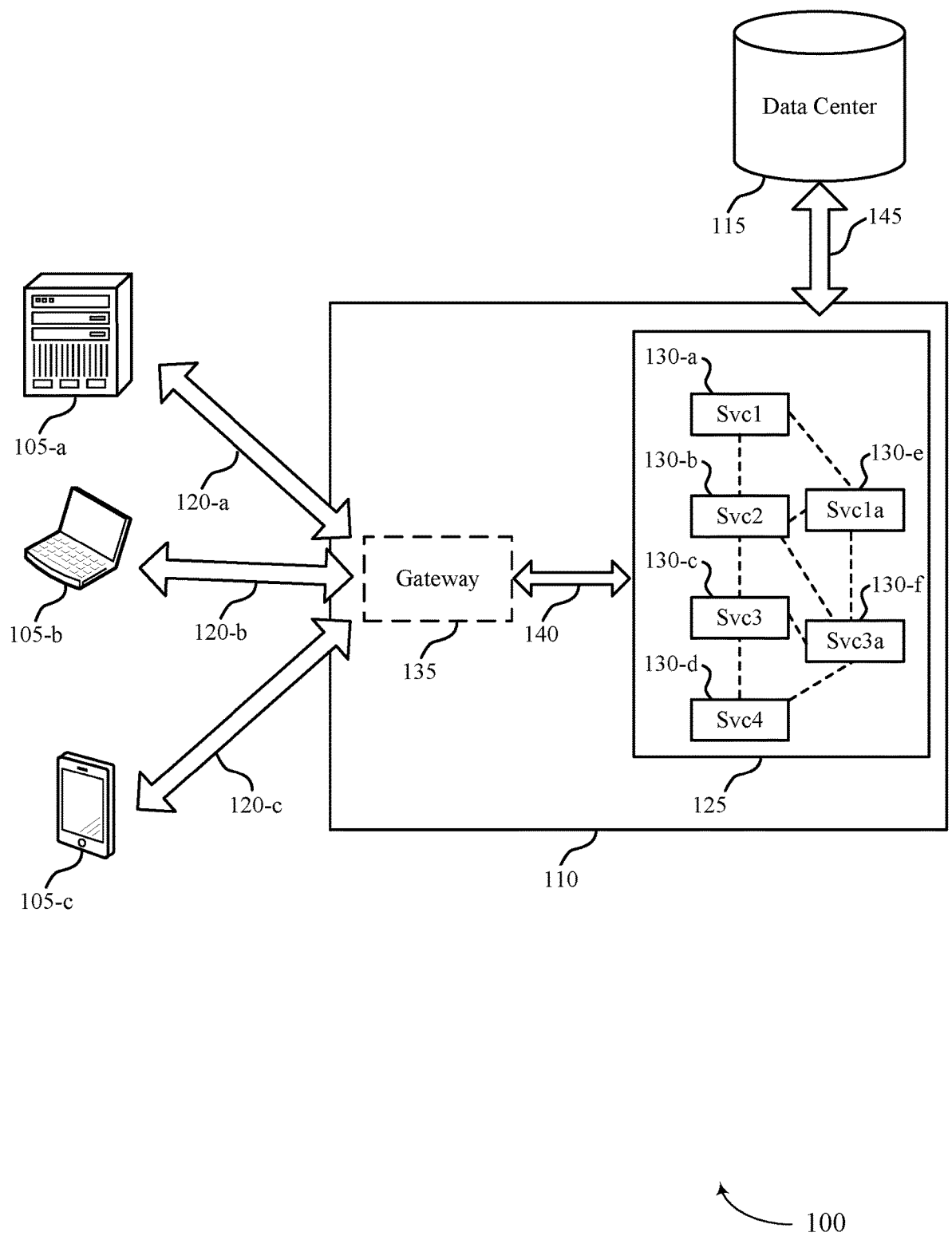
FIGS. 1 and 2 illustrate examples of an environment that supports distributed tracing techniques for acquiring business insights in accordance with aspects of the present disclosure.

A distributed system may be used to process large amounts of data, and may include many components configured to perform various processes as a request (e.g., from a user device) flows through the system. As an example, an application may be implemented using a microservices architecture or service-based architecture. The microservices or service-based architecture may include a set of multiple services (or microservices), and each service of the set may perform a particular function, process, or sub-process of the application. Due to the nature of a distributed microservices architecture, individual services may be distributed amongst different domains. Therefore, when an application implemented by a distributed microservices architecture is executed and a request is received, the multiple services serving the request may communicate across domains. Some domains of the services may be collocated, while others may be located remotely, or both. In addition, since a service may have been generated in isolation, different services may use different programming languages, different vendors, different platforms, and the like. Thus, each individual service may be easily analyzed for both diagnostic and business related purposes, however, analyzing the application as a whole, without negatively impacting the end-to-end user experience of the application, may be difficult. This may be due to the complexity of the system architecture (e.g., the interconnections between services), the number of individual services, the high volume of data flowing through the system, or a combination of these factors. For example, if data is being lost within the system or a transaction is taking relatively too long to propagate through one or more services, it may be difficult to determine which service(s) or process(es) are causing the problem.

Distributed tracing may include techniques used to track actions and events that occur across the various distributed services of an application. For example, instrumenting an application based on a distributed architecture may include adding distributed tracing code to each service that makes up the application. A trace may include one or more spans that are each associated with a service. The distributed tracing code added to each service may allow the service to execute the associated span. In such cases, the spans and other related information (e.g., timing information, metadata, identifiers) may enable diagnostics for a single transaction that is processed by a system, enabling the identification of various issues that may arise with one or more of the services for that particular transaction. However, in some cases, it may also be important to capture information about a certain user or group of users that use the application. Specifically, there may be a need to efficiently track a complete customer-specific experience across distributed microservices and service-based environments without adding unnecessary complexity to the system (e.g., through the use of multiple different tools).

As described herein, distributed tracing techniques may be used for generating trace data for a complete end-to-end customer journey across service (i.e., microservice) domains, where both diagnostic information and user-specific transaction information may be correlated and pinpointed to each service within a distributed application environment. Such techniques may enable an organization to identify what service(s) may be causing an issue (e.g., resulting in a customer experience problem) throughout a user journey, while also identifying customer-specific journey information that may be used to achieve various business objectives. As an example, for a single request or transaction that propagates through a system (e.g., initiated at a user device), the information obtained for respective services (e.g., associated with one or more spans) using distributed tracing techniques may further include data and information used for business insights, enabling improved analysis and understanding of the customer experience when using an application. In such cases, a trace may be used to capture how long it takes a request to be performed across distributed microservices, and the trace may also be dynamically configured to capture customer-specific information related to the request, such as a geographic location of the user device (e.g., longitude, latitude, city, state), a time of day the user device initiated the request, a type of the transaction (e.g., a financial transaction, such as a banking transfer), among other examples. Such information may be used to determine ways in which the distributed system may be improved for various customers (e.g., high-value customers, customers having an account balance that satisfies a threshold, or the like). The additional business insights may be obtained in near real-time through the distributed tracing techniques (e.g., in addition to technical diagnostic information). This may enable an organization to achieve improved visibility into ways that an application may be enhanced for operational performance as well as to achieve the organization's business objectives. In some cases, the techniques described herein may be implemented using a code wrapper that enables the collection of diagnostic information and user-specific transaction information when generating a same set of trace data. Such techniques herein may accordingly enable the efficient collection of both diagnostics and information related to a complete customer journey using a single traceability tool and without the use of other, separate services or techniques, thereby avoiding the addition of unnecessary complexity and overhead to the system.

Aspects of the disclosure are initially described in the context of environments that include distributed systems supporting microservices-based applications. Further examples are then provided that illustrate systems and user journeys that support enhanced tracing techniques used to acquire user-specific transaction information. In addition, example visualizations of trace data for a user journey are provided. Aspects of the disclosure are further illustrated by and described with reference to apparatus diagrams, system diagrams, and flowcharts that relate to distributed tracing techniques for acquiring business insights.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

FIG. 1 illustrates an example of an environment 100 for data processing that supports distributed tracing techniques for acquiring business insights in accordance with aspects of the present disclosure. The environment 100 includes one or more clients 105, a system 110, and a data center 115. A client 105 may access the system 110 over a network connection 120. In some examples, a client 105 may be an example of a user device, such as a server (e.g., a client 105-*a*), a laptop (e.g., a client 105-*b*), or a smartphone (e.g., a client 105-c), among other examples. For instance, a client 105 may be a desktop computer, a tablet, or another computing device or system capable of generating, analyzing, transmitting, or receiving communications. In some examples, a client 105 may be operated by a customer (e.g., an individual or business) that purchases goods or service from an enterprise, company, or organization. Additionally or alternatively, a client 105 may be operated by a user that is part of a business, an enterprise, a non-profit, a startup, or any other organization type.

The network connections 120 may implement a transfer control protocol and internet protocol (TCP/IP), such as the Internet, or may implement other network protocols. The network connections 120 may be examples of one or more wired or wireless connections with the system 110, where bidirectional data may be communicated between the system 110 and the clients 105. As an example, network connection 120-a may be an example of a wired connection that enables communications between client 105-a and the system 110. The wired connection may include, for example, communications using Ethernet cables, fiber-optic communications, or other wireline communications. In other examples, one or both of network connection 120-b or network connection 120-c may be an example of a wireless connection that enables communications between client 105-b or client 105-c, respectively, and the system 110. The wireless connection may include communications in accordance with one or more wireless communications or radio access technologies, such as Long Term Evolution (LTE) technologies, LTE-Advanced (LTE-A) technologies, fifth generation (5G) technologies (which may be referred to as New Radio (NR) technologies), wireless local area network (WLAN) technologies, such as Wi-Fi (i.e., Institute of Electrical and Electronics Engineers (IEEE) 802.11), among other examples.

The network connections 120 may include communications, signaling, transactions, requests, or any other interaction between a client 105 and the system 110. As such, a client 105 may access the system 110 to store, manage, and process data that is, for example, associated with an account, an application, a service, or any combination thereof, that may be provided by the system 110. In some cases, a client 105 may have an associated security or permission level, and the client 105 may provide credentials enabling access to the system 110 (e.g., over a network connection 120). A client 105 may have access to certain applications, data, and database information within the system 110 based on the associated security or permission level, and may not have access to others. A client 105 may also be referred to as a customer, a potential customer, a lead, a client, or some other suitable terminology. In some cases, the client 105 may be operated by a user or group of users. The user or group of users may be associated with a business, a manufacturer, or any other organization.

The system 110 may support an application or software that is deployed based on an architecture comprising a set of services 125 (e.g., a microservices architecture, a service-based architecture), where the set of services 125 may provide on-demand services and functionality to the clients 105. For example, the system 110 may provide one or more applications or instances of software having the microservices architecture, and the set of services 125 may include one or more respective services 130 (e.g., service 130-a through service 130-f) implemented in a respective container. The set of services 125 may include the respective services 130 (e.g., components) of an application that are distributed (e.g., across servers or devices), and each element of functionality may be performed by a separate service 130. An application may accordingly include multiple services 130 (e.g., service 130-a, service 130-b, service 130-c, and so forth), where each service 130 may perform a discrete process of the application. Each of the services 130 may be scaled in different ways (e.g., based on the application), and in some cases may each be written in one or more different programming languages. In addition, one or more services 130 may be flexibly added or removed from the set of services 125 of the system 110 (e.g., to add or modify functionality of an application or software). Thus, various application functions provided by system 110 may be configured in a respective service 130, and each service 130 may run in a corresponding container (e.g., some software that packages code and dependencies of the code). In some examples, the containers (and the services 130) may communicate with each other over application programming interfaces (APIs), for example, using some communications protocol (e.g., a hypertext transfer protocol (HTTP)). The system 110 may also support applications and software having different frameworks and architectures as an alternative to or in addition to those having a service-based or microservices architecture. For instance, the system 110 may support service-oriented architectures (SOAs), or other architectures.

Each service 130 may be implemented using one or more respective databases, hardware components, software components, programming languages, or any combination thereof. Further, respective services may communicate over a network (e.g., using some protocol) such that various services 130 may be deployed independently from one another yet remain coupled other services 130. An application deployed using a microservices architecture (e.g., an application supported by the system 110 and set of services 125) may provide functionality to the clients 105 (e.g., user devices, desktop computers, laptops, smartphones, tablets, or other computing systems) for different operations, functions, programs, and services. In some cases, an application or software supported by the system 110 may support financial transactions and functions including, for example, account access, investment services, banking transactions, purchasing/selling vehicles, or the like.

The system 110 may optionally include a gateway 135 that is configured as an intermediate service between the clients 105 and the set of services 125. For example, the gateway 135 may be an example of an API gateway that provides a single entry point for clients 105 to interact with the system 110 and the set of services 125 (e.g., microservices). In such cases, the gateway 135 may communicate with the set of services 125 via a connection 140 and may accordingly serve as a single endpoint for one or more of the services 130. In such cases, the gateway 135 may forward requests, transactions, or information from the clients 105 to respective services 130. In other examples, the clients 105 may communicate directly with the set of services 125 (e.g., in accordance with a direct client-to-microservice communication architecture).

In some cases, the system 110 may be implemented using remote servers or devices, where the remote servers may be located at one or more data centers 115. The data center 115 may include multiple servers that may be used for data storage, management, and processing. The data center 115 may receive data from the system 110 via connection 145. In some examples, the data center 115 may utilize multiple redundancies (e.g., for security purposes), and the data stored at data center 115 may be backed up by copies of the data at a different data center (not pictured).

In some examples, the system 110 may be an example of a distributed system or a cloud platform (e.g., a computing platform for cloud computing), and the system 110 may be employed by many devices to store, manage, and process data using a shared network of remote servers. Users may develop applications on the cloud platform to handle the storage, management, and processing of data. The system 110 may support user transactions (e.g., financial transactions), for example, through a website, through a mobile application, or the like. A user may utilize the distributed system for other purposes. The distributed system may include multiple groups of machines performing various tasks in a coordinated fashion to process data flowing through the system.

The system 110 may be configured to process large amounts of data (e.g., over a hundred million events per day), for example, using the set of services 125. Due to the high volume of data and the large number of services 130 processing the data, it may be difficult to perform a diagnostic analysis on the system. As such, distributed tracing techniques may be used to identify information associated with each of the one or more services 130. Distributed tracing (which may also be referred to as distributed request tracing) may include techniques for monitoring and diagnosing issues within system 110 and the set of services 125. Distributed tracing may be used to track (e.g., trace) a course of a user request (e.g., from a client 105) as it propagates through the one or more services 130 (e.g., comprising an application provided by the system 110). Such techniques may be used to identify bottlenecks, bugs, latency, or other issues that affect the performance of the application and respective services 130. That is, distributed tracing may be used to acquire information about the behavior of the set of services 125 (e.g., including the services 130) for respective transactions or requests that pass through the system 110.

A trace may include a set of one or more spans, and the trace may be representative of a transaction or end-to-end request processed through the system 110. A trace may capture, for example, data about spans (including a service name, operation name, duration, and other metadata), one or more errors, a duration of important operations within each service 130 (such as internal method calls and functions), and other attributes or information. The spans included in a trace may include a root span and one or more child spans that represent operations taking place for a request. In some cases, multiple spans of a particular trace may be linked through a trace identifier (ID).

A span may comprise a process (or a group of processes) and/or the machine or group of machines that perform the process. For example, a span may include information about a particular service 130 of the set of services 125, and the span may represent a time interval (e.g., having a begin time and end time) associated with the service 130 and representing an amount of time the service 130 took to complete. A respective span may be associated with some unique identifier for that span, and a trace may accordingly include one or more identifiers for the included spans. In some examples, each span may be associated with a set of metadata for the corresponding service 130. For example, the metadata may include a name of an operation associated with a service 130, attributes associated with the service 130, events processed as part of the service 130, among other examples. In such cases, the metadata may provide additional information associated with the span (e.g., the service 130), and max further link different services 130 to one another. In some examples, respective spans in a trace may have a relationship with one another, and may represent a path that a transaction from a client 105 takes through the set of services 125 that make up the application provided by the system 110. In addition, each span may include metrics about some service 130 that may be used for the identification of problems, issues, or delays with that service 130. In some examples, a tag may represent additional information that may contextualize a particular span. Further, a log may be an example of a record (e.g., a timestamped record) that includes some metadata related to a service 130, and a log may or may not be linked to a span.

Thus, by using distributed tracing techniques, a user may identify various issues that arise with an application (e.g., an application using the set of services 125). For instance one or more service calls may be identified as taking relatively more time than expected (e.g., exceeding a threshold). In other examples, some transaction may fail at a particular service 130, resulting in a client 105 receiving an error, and the trace data may be used to identify the service 130 that failed. Thus, generating a trace may result in trace data comprising diagnostic information used to identify one or more actions or events completed by the services 130 that may satisfy some threshold performance metric.

In some cases, however, an enterprise or organization may desire to obtain additional information related to a user journey for an application supported by the system 110. For example, a client 105 may initiate a customer journey by logging into software provided by system 110 (e.g., an online banking application), or the journey may be initiated by a user who selects an icon (e.g., on an interface of a client 105) for obtaining an account balance. In either case, a journey may represent a path taken by a prototypical user (e.g., via an application, via a website) to complete a task. In some cases, a journey may be referred to as a user flow or other terminology. The journey may begin with an initial transaction or request initiated by a client 105 (e.g., a source device), and the journey may identify key interactions and touchpoints with the application as the application completes the request. In some examples, the journey may include a series of steps towards an outcome and final action (e.g., logging into a website and updating account information, logging into an application and purchasing a product).

While distributed tracing techniques may provide technical, diagnostic information related to the various events processed by the set of services 125, it may be beneficial for an enterprise to obtain additional journey information related to the user, or the client 105, or both. For instance, it may be useful for the enterprise to understand how many users with a particular account balance (e.g., above a threshold) are affected by latency or delays issues when logging into an account and while using a mobile device (e.g., a client 105-c). In other examples, it may be beneficial for the enterprise to determine a quantity of users within a particular geographic region that experience issues with an application when transferring funds between accounts (e.g., between a checking and savings account). In some other cases, the enterprise may desire to identify a number of successful and unsuccessful financial transactions for customers who have balances that satisfy a threshold (e.g., balances greater than $10,000) who used mobile phones to initiate the transaction at some time of day (e.g., between 10:00 am and 2:00 pm). In any case, the additional user-specific transaction information processed by system 110 (and the set of services 125) may be used to provide targeted solutions to various issues users are experiencing. In addition, such information may allow the enterprise and information technology resources to identify what may be causing a customer experience problem and/or identify important customer-specific journey information to achieve business objectives. Thus, by obtaining the additional information regarding the user of a particular application (e.g., provided by system 110), an enterprise may implement techniques for minimizing issues or problems for various users (or groups of users) using an application, while also developing business objectives that are targeted for those same users (and user groups).

Acquiring the user-specific information, however, may require a number of different tools and techniques applied to the system 110 to obtain the information. But such tools may be cumbersome to implement, and may add further complexity to the system 110. For example, two or more different tools may need to be applied to the system to respectively identify information related to a location of the user and a type of the client 105. In some other examples, traceability tools may not provide the ability to track complete individual customer experiences across complex microservices environments. In addition, some other traceability techniques not described herein that do have data collection mechanisms may, for example, be fragmented across browser tools, time series, logs, or any combination thereof. As such, these solutions may be cost prohibitive as they may require the integration of multiple systems and data acquisition schemes to obtain the user-specific information for a complete customer journey.

To solve these problems and provide other advantages, the system 110 may support the efficient collection of user and business-related transaction information for multiple services, while simultaneously collecting records of events that occur for a particular request. For example, the user and business transaction information, as well as the event records, may be acquired for a user journey using a same technique when generating a trace, and the information may be use to provide various insights into improving a user journey when using an application. In particular, a trace may be generated for a user journey that is initiated by a user device (e.g., a mobile device, a personal computer). The journey may be initiated by the source device (e.g., a client 105) and via an application that is based on a microservices architecture, where respective journeys may be associated with, for example, a user creating a new account (e.g., creating a savings account, creating an investment account), transferring funds between accounts, or logging into an account via a web-based or mobile application, among other examples. The trace generated for the journey may include one or more spans, and each span may correspond to at least one service 130 of a set of services (e.g., the set of services 125) that provide functionality to the user journey (e.g., as respective components of the application). Based on the generated trace including the one or more spans, both diagnostic information and user-specific transaction information may be collected for the user journey. For example, the diagnostic information may include information associated with a service 130 (e.g., how long service 130-c took to complete) and the user-specific transaction information may include information related to the user and/or the transaction for that particular service, such as a location of the user, a time of day, a type of client 105 used for a transaction, a type of transaction, among other examples. The diagnostic information and user-specific transaction information may be stored and processed by the system 110. Such techniques may provide efficient acquisition and improved availability of user-specific information that is coupled with diagnostic information for a user journey, resulting in robust business insights into a user's experience with an application supported by system 110, among other advantages.

It should be appreciated by a person skilled in the art that one or more aspects of the disclosure may be implemented in a system 110 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
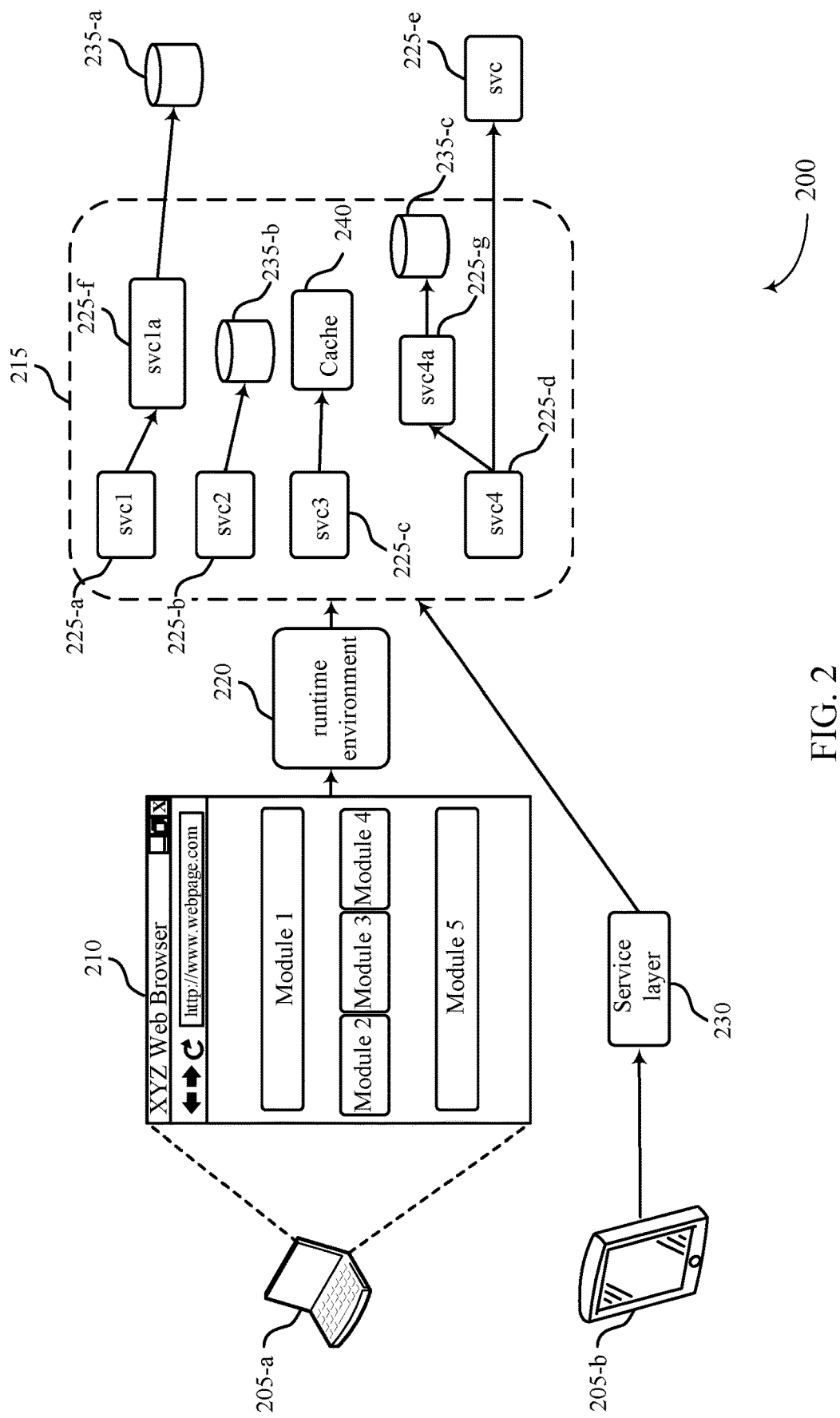

FIG. 2 illustrates an example of an environment 200 that supports distributed tracing techniques for acquiring business insights in accordance with aspects of the present disclosure. The environment includes devices 205-a and 205-b, which may be examples of the clients 105 as described with reference to FIG. 1. For example, the device 205-a may be a laptop computer and the device 205-b max be a mobile device (e.g., a smartphone), among other examples. The device 205-a may use a web browser, such as web browser 210, to access a system 215 providing an application, which may utilize a service-based architecture such as a microservices architecture. The device 205-b may use a mobile application to access a system 215 providing the application via a service layer 230. The microservices architecture of the application may include a set of services and/or subservices, such as services 225-a through 225-g.

In some examples, an organization may move away from so-called monolithic applications (e.g., standalone and self-contained applications) and instead use distributed service-based or microservices architectures. For example, a microservices architecture may include multiple component services 225 (e.g., microservices) distributed over different domains, and each service 225 may be independently deployed to provide a particular function. The distributed component services 225 may be coupled to each other and may operate in coordination to provide the functionality of the application. Put another way, a single application may include a number of respective services 225 (e.g., services 225-a through 225-g) located in various domains, where each service 225 performs a specific function in its respective domain. In some examples, the various services may be implemented using the same or different programming languages, may be distributed across different physical locations, devices and/or servers, and may be relatively independent of one another (e.g., one service 225 may be scaled without affecting one or more other services 225). Each of the services 225 may be associated with a respective container, and the services 225 may communicate with one another, for example, using APIs, message brokers, or other wired or wireless communications techniques as described in further detail with reference to FIG. 1.

In some cases, there may be a relatively high number of different component services 225 that make up an application and, as a result, the complexity of the application may increase as services 225 are incorporated, which may result in relatively increased complexity for the interconnectivity between services. In addition, understanding a complete customer journey when using a distributed service-based or microservices-based application may be complex since each service may be independently deployed. For example, a user may log into an online banking system using a device (e.g., the device 205-a or the device 205-b). Based on the number of different services 225 and corresponding components of the application, it may be difficult to analyze and/or diagnose a complete end-to-end customer experience when using the application without using a different tool for each service.

For example, the service 225-*a* may be implemented in a different programming language than service 225-*b*. Thus, a first tool, compatible with the programming language of service 225-*a*, may be used to analyze and collect diagnostic data (i.e., metric and log data) and user-specific transaction data (i.e., customer profile, customer location, or any other transaction data) when the service 225-*a* executes. A second tool, compatible with the programming language of the service 225-*b*, that may be different than the first tool, may be used to obtain the diagnostic and transaction data when executing the service 225-*b*. In particular, a user's request or transaction may deviate from an expected response time (e.g., the request may take 22 seconds or more, which may exceed a predefined time threshold (e.g., 20 seconds) for the request). In such cases, it may be difficult to tell which of the services 225 are causing the deviation in the response time. Additionally, in some cases, it may be challenging to combine diagnostic information related to the respective services 225 of the application with additional information that provides an organization with business insight into the user experience. Specifically, there may be a need to view all the transactions that go through an application including a set of services 225 (e.g., microservices) and collect additional user-specific information related to the transaction, which may be used to gain an improved understanding of the customer's specific experience and target technical solutions and modification in the application based on the additional user-specific information.

Distributed tracing may include techniques used to track actions and events that occur across the various distributed services 225 of the application. For example, instrumenting an application based on a distributed architecture may include adding distributed tracing code to each service that makes up the application. A trace may include one or more spans that are each associated with a service 225 (e.g., service 225-*a* may provide or be associated with one or more spans, service 225-*c* may provide or be associated with one or more different spans, and so forth). The distributed tracing code added to each service 225 may allow each service 225 to execute the associated span. In addition, the distributed tracing code may propagate parent span information (i.e., a span associated with a service 225 that executes upstream from a current service 225 and its associated span), such as trace and/or span context, a unique trace identifier, a unique span identifier, attributes, or any other information. The propagation of the span and trace information from span to span, as a request or transaction is executed during a trace, may allow the application to collect both diagnostic and user-specific transaction data from end-to-end, as opposed to multiple tools associated with each service 225. In such cases, the spans and other related information (e.g., timing information, metadata, identifiers, tags) may enable diagnostics for a single transaction that is processed by the system 215, enabling the identification of various issues that may arise with one or more of the services 225 for that particular transaction. As described herein, distributed tracing techniques may be enhanced for generating trace data for a complete customer journey, where a trace and included spans may capture customer-specific information about certain users or groups of users that use the application. Specifically, the described techniques may enable efficient tracking of complete customer-specific experiences across complex microservices and service-based environments. In such cases, both diagnostic information and user-specific transaction information may be correlated and pinpointed to each service within an application environment.

Thus, the described techniques may enable the identification of one or more services 225 that may be causing an issue (e.g., thereby resulting in a customer experience problem) throughout a user journey while also identifying customer-specific journey information that may be used to achieve business objectives for that customer. As an example, for a single request or transaction that propagates through the system 215, the information obtained for respective services 225 (e.g., associated with one or more spans) using distributed tracing techniques may further include data and information that may be used for business insights, enabling improved analysis and understanding of the customer experience when using an application. In such cases, a trace may be used to capture how long a request may be processed across interconnected microservices, and the trace may also capture customer-specific information related to the request, such as a location of the user device (e.g., longitude, latitude, city, state) and a time of day the user performed a transaction (e.g., a financial transaction, such as a banking transfer), among other examples. Such information may be used to determine ways in which an application or distributed system may be improved for various customers.

In particular, the additional business insights obtained through the distributed tracing (e.g., in addition to technical diagnostic information) may enable an organization or enterprise to achieve improved visibility into ways that an application may be enhanced for performance and to achieve the organization's business objectives. In some cases, the described techniques may be implemented using a code wrapper that enables the collection of diagnostic information and user-specific transaction information when generating a same set of trace data. Here, the code wrapper may be applied to some tracing tools (e.g., via an API) without substantially modifying the code of the tracing tools themselves, and may provide enhanced distributed tracing techniques (e.g., for collection of additional information related to a user journey). Such techniques described herein may accordingly enable the efficient collection of both diagnostics and information related to a complete customer journey without the use of other services or techniques and without adding unnecessary complexity to the system 215.

As illustrated by the environment 200, a first user journey may be initiated by a user interacting with an interface provided by a device 205-*a* (e.g., a source device, which may be an example of a client 105 described with reference to FIG. 1). For instance, a user may interact with one or more modules or components of an interface provided by the device 205-*a* (e.g., a desktop computer, a laptop, a smartphone, a tablet, or other computing systems), which may include, for example, a browser 210 providing access to an application provided by the system 215 via the Internet. In some examples, the application may be a financial application, and the user journey may be associated with logging into an account (e.g., a financial account), viewing one or more account balances, creating a new account, scheduling a funds transfer, or the like. The application may interact with a runtime environment 220 (e.g., a back-end JavaScript runtime environment) based on a request initiated by the device 205-*a* (via the user interacting with, and making a selection in, the interface), and the runtime environment 220 may interact with the system 215. In some examples, the system 215 may be an example of the system 110 described with reference to FIG. 1. For instance, the system 215 may include a set of services 225-*a* through 225-*g* associated with the application. In some cases, the system 215 may operate at one or more data centers (e.g., operated by the organization or enterprise).

In another example, a customer may interact with a mobile application (e.g., a financial application) on a source device 205-*b* (e.g., a mobile device such as a smartphone) to initiate a second user journey. The mobile application may interact with a service layer 230, which may process and forward a request from the source device 205-*b* and interact with the set of services 225 provided by the system 215. It is noted that various journeys may be initiated by devices 205 different from those shown, including from a data center, from a web services container, and from other types of computing devices. In any case, such devices 205 may correspond to user initiation points for the user journey for a particular transaction or request that propagates through multiple services of an application.

Based on the journey initiated by the source device 205 (e.g., the first journey, the second journey), one or more services 225 of the system 215 may provide some functionality to process a request from the device 205. For example, multiple services 225 (e.g., microservices) may perform respective operations based on the journey and corresponding request from the source device 205. In this example, a first service 225-*a* (e.g., Svc1) and a second service 225-*b* (e.g., Svc2), as well as an additional service 225-*e* (e.g., Svc1a) associated with the first service 225-*a* may be involved in processing the user request. Using the enhanced distributed tracing techniques described herein, a trace may be generated for the journey and the one or more services 225 associated with the application, where one or more spans may be generated for the corresponding services 225 involved in the user journey. The spans included in the trace data may include information about a particular service 225 (e.g., the service 225-*c*), and the span may include a time interval (e.g., having a begin time and end time), a span identifier, among other information, such as tags and logs. Based on the trace data, the tags, logs, other metadata, or any combination thereof, may be generated and collected along with the trace data. In particular, a span may include or be associated with one or more tags that correspond to the request initiated by the user device. In addition, the span may include or be associated with one or more logs that may include, for example, one or more messages associated with a service 225, a failure, or other information related to the user journey. Further, metadata associated with the span may include a span ID, a trace ID, other information that provides context for the particular span, or any combination thereof. In some cases, each span may include some additional information associated with the user that may provide various business insights for modification of the application and/or one or more services 225 for the particular user.

In some examples, a remote procedure call (RPC) system may be used to collect traces and logs for respective transactions that correspond to user journeys. In such cases, the traces and logs for the transactions may not be aggregated, which may enable per-transaction analysis of at least the trace data (e.g., including the spans), where there may be an entry for every transaction that begins a journey from a source device.

In some examples, the trace data for the services 225 associated with a user journey may be stored in one or more databases 235 (e.g., database 235-*a* through 235-*c*). As an example, traces and logs may be combined in a database, such as database 235-*a*, that supports a publish-subscribe based messaging system. In addition, the trace information may be allocated in database structures that may be configured for each transaction type. Here, the information may be stored for some predefined and/or configurable time duration (e.g., 24 to 48 hours), In one example, tags that represent business attributes and data acquired from the trace data of a journey may be stored, for example, in a relational database, such as database 235-*b*. Additionally or alternatively, logs associated with the tags having key value pairs that are connected with the tags) may be stored in a raw data storage environment. In other examples, one or more traces that may be generated from the distributed tracing techniques, and comprising trace data across the one or more services 225 (e.g., microservices) that make up a particular application and customer transaction flow, may be stored in a columnar database, such as database 235-*c*.

Thus, the trace data and the corresponding information may be stored in one or more databases 235. In some cases, different databases 235 may be associated with different services 225. In some examples, the databases 235 may be located within the system 215 (e.g., and at a local data center), such as databases 235-*b* and 235-*c*. In other cases, one or more databases 235 may be located or provided by other systems that are external to the system 215, such as database 235-*a*. In some examples, the trace data may be stored in hardware or software providing a cache 240, where some information in the cache 240 may be stored in one or more other databases 235 and may be readily available for analysis.

In some aspects, software development kits (SDKs) (e.g., open telemetry SDKs) may be used to provide specific pieces of code and associated libraries that are configured to enable tracing of the journey, where a distributed tracing framework may provide the ability to capture technical diagnostic information about a transaction as well as additional user-specific transaction information for the journey. In such cases, the diagnostic information and the user-specific transaction information may be captured as part of the same transaction/operation using a distributed tracing framework, and the combination of information collected may provide business insights for analysis of the user's experience throughout the journey.

The distributed tracing techniques supported by the environment 200 may enable the collection of both diagnostic information (e.g., how long a service 225 took to complete) and user-specific transaction information (e.g., a location of the source device, a type of transaction initiated by the source device) using the same tracing techniques. In such cases, the user-specific transaction information may provide various business insights into the user experience, and the combination of the business and technical insights may be used for various enhancements to the application. For example, an organization (e.g., information technology resources within the organization) may troubleshoot one or more problems for a high-value user (e.g., a customer who regularly uses the application, a customer who purchases a relatively large number of services 225 provided by the organization, a customer who has one or more account balances over a threshold) differently than some other users. Additionally or alternatively, the organization may extract the business insights from the trace data and use the insights for other types of user-specific analytics (e.g., determining that some customers prefer a particular type of device for some transactions, signaling a focus to further develop aspects of an application related to the type of device). In some other examples, the organization may identify what time of day so-called high-value users access an application (e.g., a banking website or service) or what geography high-value users access the site from on a particular day of the week.

Accordingly, by capturing the events performed by the one or more services 225 in response to a request, in addition to further information related to business transactional data or user data, or both, a complete understanding of the journey may be determined. In such cases, the same tracing techniques may be used to capture both types of information, where the described techniques may enable an ability to analyze the information in approximately real time and on a transaction-by-transaction basis since the collection of the information may occur as the transaction happens. For example, a customer may request to view their balance at the device 205-*a* or 205-*b*. This request may be handled across the multiple internal and externally hosted services 225. The set of services 225 that may be responsible for executing the request to view a balance may share the same trace identifier (i.e., trace_id). This trace_id may be propagated from span to span as the set of services involved in fulfilling the request to view a balance executes through the trace.

The distributed tracing code added to each service 225 may include code that specifies the attributes to be collected during each span, as described in further detail herein, and code that specifies user-specific transaction data to be collected during each span. For example, in order to associate each span with a specific customer and customer data, a trace max include obtaining a customer identifier, such as a customer_id. As an example, a customer_id may be inserted into and extracted from trace data according to the following:

```
@Override
public void set(HttpURLConnection carrier, String key, String value) {
// Insert the context as Header
if(key.equalsIgnoreCase("customer_id")){
    carrier. setRequestPropertyikey. value);
    }
}
TextMapGetter<HttpExchange> getter =
new TextMapGetter<>( ) {
@Override
public String get(HttpExchange carrier, String key) {
    if (carrier.getRequestHeaders( ). containsKey(key)) {
        return carrier.getRequestHeaders( ).get(key).get(0);
        }
    return null;
    }
};
```

In this example, the trace may collect the customer_id associated with the customer that initiated the request (i.e., view balance request), and the customer_id may be inserted or extracted from the trace data as the request proceeds from service 225 to service 225.

The data obtained during each span may be collected in a span object. For example, once a customer has been authenticated, a customer_id may be inserted into the span object, which may include the following information for the request to view a balance:

```
{
    "service_name": "balance",
    "trace_id": "a62a2728a2cb4f5e3adbO4455935c63d"
    "event": "LOAD_DASHBOARD",
    "customer_id": 7432851812,
    "event_timestamp": 1620920009,
    "status": "success or failure",
    "duration": 2000 ms
}
```

The span object may be used to propagate information from span to span as each service 225 in the request path is executed. The span object may be customizable, allowing multiple attributes to be set for collection during a span. The propagation of information from span to span ensures a complete end-to-end view of a customer's journey associated with a request since it allows the information for each service 225 that is executed during the request to be collected at the same time.

Once the information from the span object has been received by the system, it may be parsed in order to validate the data (i.e., ensure the data complies with the specification format). The request associated with the trace may then move to the next service 225 in the trace. Each service 225 in the trace may execute distributed trace code that propagates information from the trace as a whole, and from the previous span, and may or may not add this data to the span object. For example, a service 225 that may request data from a data source that contains customer information may collect customer details associated with the customer_id that made the request, such as a first name, last name, account start date, current balance, or any other customer information. As an example, the customer information may include the following:

```
{
    "service_name": "balance",
    "trace_id": "a62a2728a2cb45e3adb04455935c63d"
    "event": "LOAD_DASHBOARD",
    "customer_id": 7432851812,
    "event_timestamp": 1620920009,
    "status": "success"
    "first_name": "John",
    "last_name": "Smith",
    "account_start_date": May 5, 2021,
    "current balance": $30,300,
    "duration": 2000 ms
}
```

Here, the distributed trace may collect both diagnostic and user-specific transaction data concurrently and in approximately real time since the span data may be collected as the services 225 are executing the request. The specific diagnostic and user-specific transaction data may be configured before a trace is run. For example, diagnostic data such as the status of a service 225, and the duration (i.e., amount of time it took for the service 225 to complete) may be collected, along with user-specific transaction data such as the customer information and the account start date. The data collected from the trace may be analyzed in approximately real time due to the indexing and storage of the data for relatively quick retrieval. For example, the data collected for a trace may be indexed for a data store such as a key value store, a relational database, or any other type of data store or database. Indexing techniques such as a hash index or any other indexing technique may also be used. As an example, the trace data collected may be indexed according to a key value store where the unique trace_id may be the index or key and may include the following information:

```
Key: a62a2728a2cb4f5 3 adb0445593 5c63d.
value: {
    "service_name": "balance".
    "trace_id": "a62a2728a2cb4fe3adb04455935c63d"
    "event": "LOAD_DASHBOARD",
    "customer_id": 7432851812,
    "event_timestamp": 1620920009,
    "status": "success"
    "first_name": "John",
    "last name": "Smith",
```

-continued

```
"account_start_date": May 5, 2021,
"current balance": $30,300,
"duration": 2000 ms
}
```

In this instance, the key is the trace_id and the value is the trace data associated with the trace_id. This key value store may be used for diagnostic or business analysis, however, on its own, the key value store may be limited in the type of analysis and insights that may be determined. For example, using this key value store, a list of trace_id's that may include a failed status may be determined. However, it may be difficult to determine which customers over a given time period resulted in failed status.

Therefore, the information collected during the trace may also be indexed according to a hash index on a relational database. For example, the index for a first relational database may be a hash index where the primary key is the customer_id (i.e., 7432851812). The index for a second relational database may be an index where the primary key is the event timestamp (i.e., 1620920009). This indexing scheme may allow the data collected, both diagnostic and user-specific transaction data, to be retrieved relatively quickly and analyzed in approximately real time. The data stores may enable the trace data to be analyzed for diagnostic information (i.e., check the list of trace_id's that exceeded a threshold duration, obtain a list of trace_id's that failed in a time range, or any other diagnostic analysis), and for business analytics (i.e., obtain a list of customers who were not able to see their balances due to a system error, a list of customers who had balances above a threshold and failed to see their balances, a list of customers who started their account after a certain date and their average balances over the last year, or any other business analytics).

In addition, utilizing a single data store, such as a data warehouse system, to store trace data may not scale well in a distributed services-based architecture since business analysis may occur offline at the data warehouse. This may prevent approximately real time analysis and slow a response to various problems or errors that may occur. Therefore, indexing the data in multiple ways over multiple data stores allows for the most flexibility in both diagnostic and business analysis of data. For example, an enterprise may not know all of the ways in which the trace data collected may be used in the future. Indexing the data in multiple ways over multiple data stores allows an enterprise flexibility and scalability in how they retrieve the collected data.

For instance, when going through service-to-service calls, an organization may pull customer data and put the information into the enhanced traceability tools to perform further analysis against the customer data. In such cases, further analytics may be performed on the results, including how often some types of users are logging in, where users are logging in from, trend analysis, successes and/or failures corresponding to the user experience, generation of scores for the user experience, a number of times a user waited for transactions to complete, among other examples. Both the way the data is pulled (e.g., at the same time as the event data corresponding to different services 225) and how the data is used (e.g., for business analytics) may provide various advantages for further enhancements and modifications to an application supported by the system 215.

Further, since the collection of the information may occur as the transaction happens, and the techniques may enable configurations that provide for targeted collection of specific user information to be included in the trace data. As an example, an organization may view the location (latitude and longitude) of all successful and unsuccessful bank transfers for customers who have balances greater than $10,000 who used mobile phones for the transfers. In another example, the trace data may be used to generate a correlation between users who have over $100,000 in their account and are logging in between 10 am and 11 am in a particular geographic location (e.g., South Carolina). Here, the additional user-specific (and device-specific) transaction information may be included in the spans themselves as part of the trace data. In some examples, the user-specific transaction information may include a location of a source device (e.g., a client), a type of transaction (e.g., creating a new account), a type of request (e.g., transferring funds), a type of the source device (e.g., a personal computer, a mobile device), user account information (e.g., one or more account balances, age of one or more accounts), a user classification (e.g., a type of customer based on one or more parameters), or any combination thereof. Other user-specific transaction information may be acquired via the enhanced distributed tracing techniques described herein.

Environment 200 may thus support traceability tools that are configured to efficiently capture and predict individual customer journeys when using an application having, for example, a microservices architecture, a service-based architecture, or the like. The traceability tools described herein may include infrastructure, APIs, SDKs, and design patterns that may be used to generate and analyze metrics, logs, and traces across some application environments and associated services and microservices. Such techniques may enable the focused improvement of customers journeys (confirming a financial transaction, executing a banking transaction, validating a checking balance) from a browser, from a mobile device, or the like. Further, the described traceability tools may implement a distributed tracing framework standard that may be configured to identify information that provides insight into the user experience. The configuration may include a specific code wrapper included as a part of the distributed tracing framework. For instance, the code wrapper may enable the customization of distributed tracing tools that collect additional, user-specific information along with diagnostic information. In addition, various coding standards and installation patterns may be utilized when using the described techniques.

In some examples, the distributed tracing tools described herein may include one or more extension dependencies (e.g., extensions that may rely on another extension) that may be added to the code of respective services. As an example, the extension dependencies may include the following information:

```
dependency
    <groupId>io.tracingtool</groupId>
    <artifactId>tracingtool-api</artifactId>
    <version>1.0.0</version>
</dependency>
<dependency>
    <groupId>io.tracingtools/groupId>
    <artifactId>tracingtool-extension-annotationss</artifactId>
    <version>1.0.0</version>
</dependency>
```

In some examples, a tracer (e.g., a tracer interface) may generate the trace data including the one or more spans. In such cases, the tracer may create a new span as well as inject and extract context for the span. In such cases, the tracer may record the spans when generating trace data (e.g., for a user journey). In such cases, the attributes of a span may be set such that the span collects some configured information for the one or more services (e.g., microservices) of an application, such as the services 225 of the application provided by system 215. The following provides an illustrative example of some attributes (e.g., including annotation denoted with //) that may be set for a span:

```
@WithSpan
public JsonArray getProfileInfo(String journey) {
   JsonArray customerDetailsArr = new JsonArray( );
   // Parent Span
   Span authzSpan = Span.current( );
   Span profileinfo =
      tracer
       .spanBuil der("getProfileInfo")
       .setParent(Context. current( ). with(authzSpan))
       .setSpanKind(SpanKind.CLIENT)
       .starts pan( );
   Span = null;
   // Make the thread scope to the current span
   try (Scope - profileInfo.makeCurrent( )) {
      // Access to the current span.
      span = Span.current( );
      // Network call.
      customerDetailsArr = CustomerRepository.getCustomers(1);
      // Set Attributes
      span.setAttributes("journey.name", journey);
      span.setAttributes("profile.name", "customer");
      span.setAttributes(StatusCode OK, "success");
   } catch (Exception e) {
      logger. error(Excepti on occurred while getting profile info/t" +
e.toString( ));
      JsonObject errorJs = new JsonObject( );
      customerDetailsArr. add(errorJs);
      span.setStatus(StatusCode. ERROR, "exception");
   } finally {
      span.end( );
   }
   return customerDetailsArr;
}
```

In the above example attributes may be set for a journey, as well as customer information and successful transactions. It is noted that while the above example includes the use of JavaScript object notation (JSON), other file formats may be used, and the examples described herein should not be considered limiting to the scope of the claims and disclosure.

To generate trace data across service boundaries (e.g., including containers and API calls) in the system 215, each service 225 may continue the trace using request headers such that the functions originating from a same root span (and corresponding service 225) may be collected together. In some aspects, b3 header propagation techniques may be used for header propagation in the system 215.

The traceability tools and techniques described herein may enable business transactions to be observable and traceable by combining context, information, and specific knowledge about the business transactions and services 225 (e.g., microservices) involved, which may thereby create a detailed understanding of customer journey information. Such techniques may enable data processing solutions that use traces, metrics and logs to create a granular, observable individual customer journey. For example, traces may provide information regarding the activity associated with an individual customer journey as it flows through the services or microservices of an application (e.g., the services 225, the application). Traces may provide the context for one or more observability tools and allow for the identification of failures (e.g., application parameter mismatches, empty fields, credential errors) and performance issues.

The metrics may include quantitative information about specific processes, counters, gauges, or any combination thereof, that are part of the application and infrastructure. In some aspects, the metrics may include target thresholds, for example, in the form of service level objective, service level indicators, service level agreements, or the like. In some examples, the metrics may include relatively granular latency targets within the application such metrics may include counts or measurements over a specified time. Some example metrics may include, a customer investment dashboard load in under 1000 milliseconds (ms), retrieval of a customer profile in under 1200 ms, loading a mobile dashboard in 500 ms or less. These examples are provided for illustrative purposes only, and should not be considered limiting to the scope of the claims or the disclosure. For example, different functions and time durations may be possible, and different metrics may be associated with respective services 225. In some examples, logging may capture comprehensive logs from infrastructure and applications that provide a distinct record of what happened with a set of specific business transactions processed by microservices. In some cases, the logs may be attributed within a specific time period.

Figure 3:
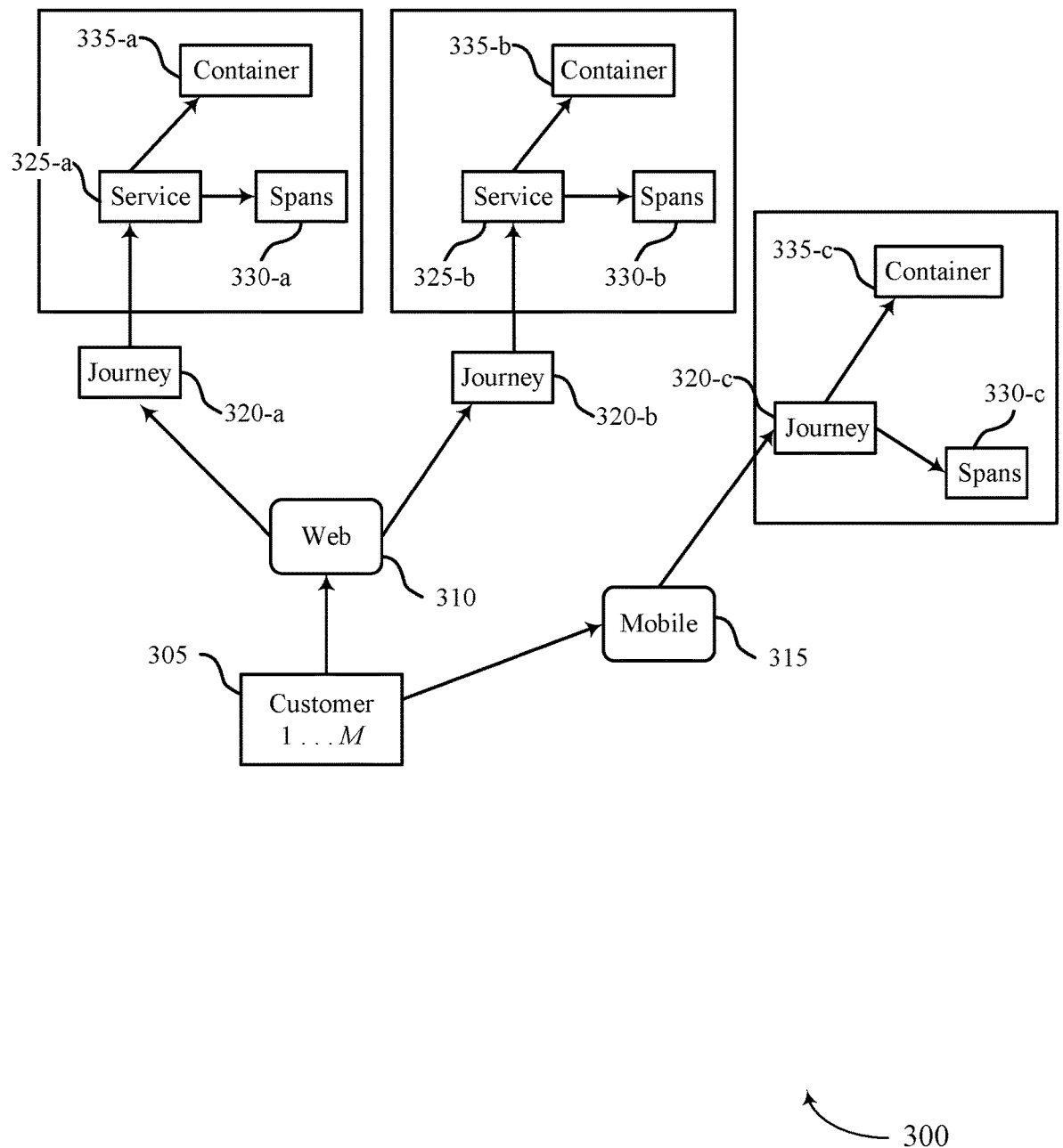
FIG. 3 illustrates an example of user journeys in a system that support distributed tracing techniques for acquiring business insights in accordance with aspects of the present disclosure.

FIG. 3 illustrates an example of user journeys 300 in a system that supports distributed tracing techniques for acquiring business insights in accordance with aspects of the present disclosure. FIG. 3 may illustrate various aspects of a customer journey (e.g., opening an account, a logon, or the like). For example, the user journeys 300 may include one or more customers 305 (e.g., customers 1, 2, . . . , M) using respective devices to initiate a journey, where each device may be an example of a client 105 described with reference to FIG. 1. For example, a customer 305 may use a device such as a smartphone, a tablet, or other computing system, to access a web-based application (e.g., via web 310) or a mobile application 315. The web 310 and the mobile application 315 may allow the customer 305 to interact with software or an application to initiate a journey, such as journey 320-a, journey 320-b, and journey 320-c (e.g., a user journey, a customer journey). In some examples, the application may be an application based on a service-based or microservices architecture as described herein. As such, the application may access a set of multiple services, such as services 325-a and 325-b. Each service 325 (e.g., services 325-a and 325-b) may be associated with one or more spans 330, such as spans 330-a and spans 330-b, for example, when generating a trace for the corresponding journey 320 (e.g., service 325-a may initiate one or more spans 330-a, service 325-b may initiate one or more spans 330-b, and so forth). In other examples, a journey may be associated with a span, such as the journey 320-c and an associated one or more spans 330-c. In some examples, each service 325 or journey 320 may be executed in an associated container 335, such as container 335-a, container 335-b, and container 335-c.

In some cases, the one or more customers 305 may use a respective device to access the application, such as an application based on a microservices architecture. The application may be associated with a financial institution, such as a bank, and the customer 305 may access the banking application to perform a task, such as opening an account, logging in to an existing account, setting up a transfer, or the like. By using the enhanced distributed tracing techniques described herein, the tasks or actions the customer 305 performs using the application may be isolated in respective journeys, such as journeys 320-*a*, 320-*b*, and 320-*c*. For example, a customer 305 may use a device to access the application via the web 310 to open an account, which may initiate the journey 320-*a*. In another example, a customer 305 may use a device to access the application via the web 310 to log in to an existing account, which may initiate the journey 320-*b*. In another example, the customer 305 may use a mobile device to access the application via a mobile application 315 to set up a bank transfer, which may initiate the journey 320-*c*.

Because each task may be isolated into its own journey (e.g., journeys 320-*a*, 320-*b*, 320-*c*), a trace may be generated for each of the journeys 320, as described in further detail with reference to FIG. 2. The trace for each journey may also generate one or more spans, such as spans 330, for each of the services traversed in a single journey 320. For example, when the customer 305 opens an account, the journey 320-*a* may be initiated. In order to process the customer 305's request to open an account, the journey 320-*a* may execute the service 325-*a* in container 335-*a*. As described in more detail with reference to FIG. 2, a generated trace may include the one or more spans 330-*a* associated with the service 325-*a*. The one or more spans 330-*a* may include information about the service 325-*a*, a time interval (e.g., having a begin time and end time), a span identifier, diagnostic information among other information, such as tags and logs.

The spans 330-*a* may also include user-specific transaction data in addition to the diagnostic data. Accordingly, by capturing the events performed by the one or more services (i.e., the service 325-*a*) in response to the request to open an account, a complete understanding of the journey may be determined. Therefore, beyond aiding in diagnostic analysis, for example, if the service 325-*a* returned an error, or whether the customer 305 was able to successfully open an account, information about the complete, end-to-end journey of the customer 305 attempting to open an account may be collected. This may include information about where the customer 305 was located when opening the account, how long it took to open the account, and the like. Accordingly, by isolating the journey 320-*a* associated with the specific transaction of opening an account, business insights may be determined based on the specific journey (e.g., opening an account), the specific customer (e.g., different journeys for the customer 305 may be analyzed), and the like.

Figure 4A:
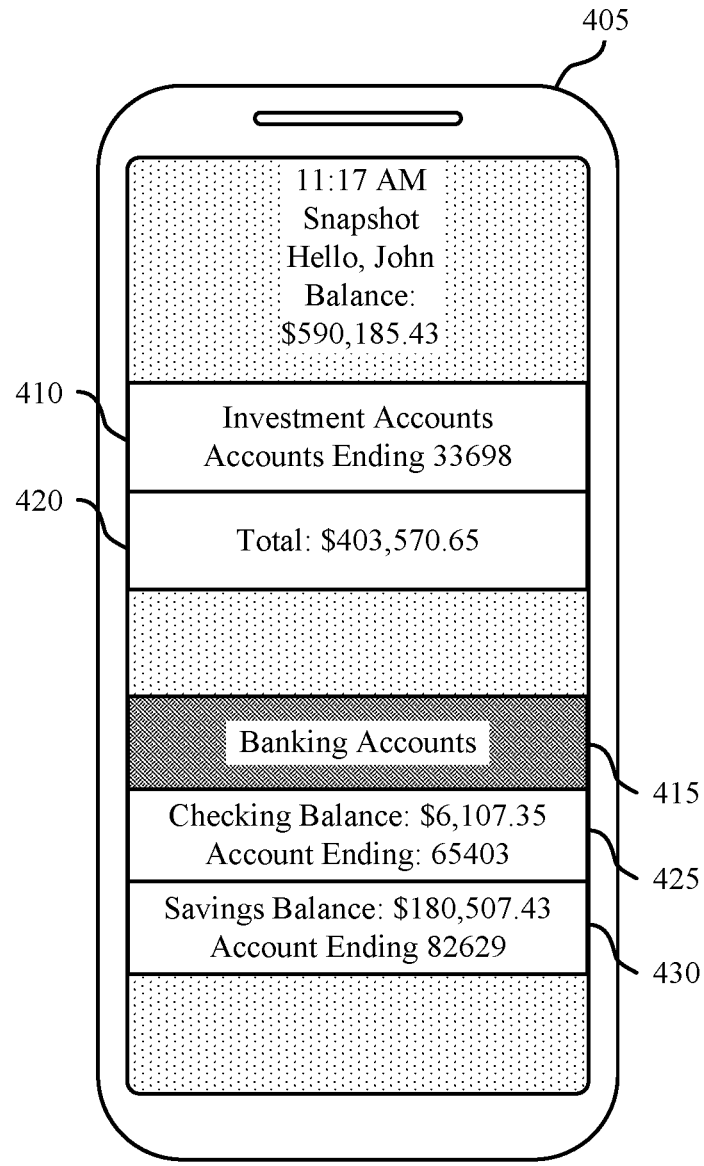
FIGS. 4A and 4B illustrate examples of an application and a user journey in a system that supports distributed tracing techniques for acquiring business insights in accordance with aspects of the present disclosure.
Figure 4B:
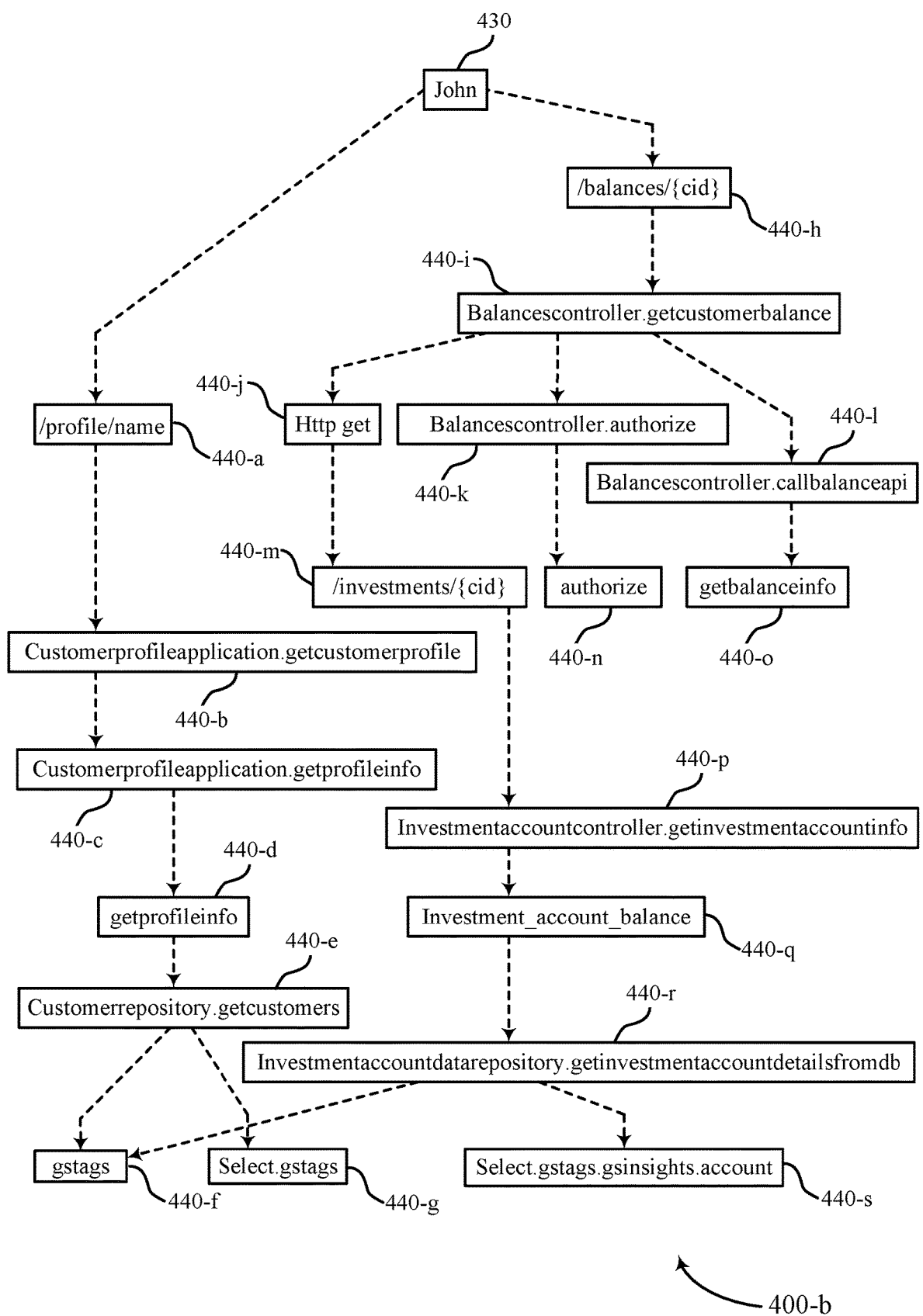

FIGS. 4A and 4B illustrate examples of an application 400-*a* and a user journey 400-*b* in a system that supports distributed tracing techniques for acquiring business insights in accordance with aspects of the present disclosure. FIG. 4A includes a device 405, which may be an example of a client 105 described with reference to FIG. 1. For instance, the device 405 may be an example of a smartphone, a tablet, or other computing system. In some examples, the device 405 may provide an interface by which a user may interact with software or an application 400-*a* to initiate a journey (e.g., a user journey, a customer journey, a journey 400-*b*). In some examples, the application 400-*a* may be an application based on a service-based architecture or microservices architecture as described herein. As such, the application 400-*a* may incorporate a set of multiple services that each perform some component function or process for the application 400-*a*.

In one example, the device 405 may run one or more instances of a financial application associated with and/or provided by a financial institution (e.g., a bank). The financial application may provide the user (e.g., John) with various features and services related to one or more accounts (e.g., checking accounts, savings accounts, investment accounts, retirement accounts) that are established and held with the financial institution. For instance, the user may be provided with one or more widgets, icons, modules, menus, or the like, to perform various actions and functions within the application 400-*a*. In some cases, the application 400-*a* may enable the user to create a new account, modify an existing account, transfer funds between respective accounts, and so forth. In other examples, and as illustrated by FIG. 4A, the application 400-*a* may enable the user to view current balances of one or more accounts belonging to the user. In such cases, the user may, for example, select an icon or widget within the application to view a "snapshot" of the account balances (e.g., load a dashboard that displays account information), where the selection may correspond to a transaction or request that propagates through the application (e.g., through the one or more services (microservices) of the application). As a result, the application may display the so-called "snapshot" dashboard of the user's account balances on the interface of the device 405. The process of the application 400-*a* receiving the user's request (e.g., the user making the selection via the application) to display the user's accounts until the account information (e.g., the "snapshot") is displayed, and as the request propagates through multiple services, may comprise the user journey (e.g., a journey 400-*b* as illustrated by FIG. 4B).

In such cases, the application 400-*a* may perform various processes across a number of services and corresponding containers to obtain the user's account information to be displayed, where one or more services (e.g., microservices) may be included in the respective processes performed by the application 400-*a*. As an example, the application 400-*a* may display the account "snapshot" for the user, including one or more investment accounts 410 and one or more banking accounts 415. Further, the application 400-*a* may display a total balance 420 for the investment accounts 410, as well as respective balances for a first banking account 425 (e.g., a checking account) and a second banking account 430 (e.g., a savings account). As such, the application 400-*a* (via one or more respective services) may retrieve user-specific profile information in addition to user-specific account information for the user journey.

As described herein, distributed tracing techniques may enable the acquisition of diagnostic information for the services involved in the user journey in addition to user-specific transaction information for the services included in the user journey. Such information may enable the identification of any issues (e.g., errors, delays, latency, failures) and successful functions (e.g., successful transfers, services operating within predefined thresholds or parameters) performed by the services of the application, as well as user-specific information (e.g., a type of the device 405 used to initiate the journey, a time of day when the journey was completed, a location of the device 405 when the journey was initiated) that may provide additional insight into ways in which the application 400-*a* may be modified or enhanced for this user (e.g., John) and/or other users with similar characteristics (e.g., having accounts similar to John, having account balances similar John, utilizing the application in a same region or geographic location as John, accessing the application 400-*a* in a same time range as John). In such cases, the user-specific transaction information may be collected at the same time the diagnostic information is collected (e.g., via a same trace) and on a per-journey basis.

As an example, the journey 400-*b* illustrated by FIG. 4B may represent a user journey that corresponds to functions performed by the application 400-*a* and illustrated by FIG.

4A, such as the when a user interacts with the application (e.g., selects) to display account balances (e.g., the "snapshot" for displaying the investment accounts 410 and the banking accounts 415). Specifically, the journey 400-*b* includes the selection 430 by the user (e.g., at the device 405) that initiates the journey 400-*b*. In such cases, the application 400-*a* may propagate the transaction to a set of services 440 (e.g., service 440-*a* through service 440-*s*) that each perform some component function to obtain the user's account information and balances.

The processing completed by each service 440 of the set of set of services may take some time to complete relative to a preceding step or service 440 in the journey 400-*b*. As an example, a first service 440-*a* associated with a profile name of the user may take some amount of time (e.g., 450 ms) after the selection 430. A subsequent service 440-*b* associated with retrieving the customer profile may take some other amount of time (e.g., 4 ms) after the service 440-*a* is completed. Likewise, a service 440-*h* associated with the user's account balances may take some amount of time (e.g., 328 ms) to complete after the selection 430, where one or more additional services 440 may be completed after the service 440-*h*. In some aspects, one or more services 440 may be processed sequentially or simultaneously based on the services 440 included in the application 400-*a*. Based on some predefined or configurable metrics, latency or delays within the application 400-*a* (e.g., associated with loading dashboard) may be identified through the generation of trace data for a particular journey. In addition, respective portions of the journey may be associated with some threshold amount of time to complete based on the metrics. For instance, the metrics may be configured to flag an error or delay in the application 400-*a* if a dashboard fix the user's investment accounts 410 loads in more than some threshold time period (e.g., 1000 ms). Similarly, the metrics may also flag a success operation when the dashboard for the user's investment accounts 410 loads in less than the threshold time period. Other processes may be configured with metrics used for identifying the successful and unsuccessful operations of the application 400-*a*, such as the retrieval of the user's profile information within some threshold time period, loading a mobile dashboard within some threshold time period, among other examples.

As described herein, distributed tracing techniques may be used to acquire, for the journey 400-*b*, both diagnostic information and user-specific transaction information. For instance, trace data for the journey 400-*b* may be generated to identify how long each service 440 took to reach completion (e.g., service 440-*m* took 9 ms, service 440-*n* took 51 ms to complete, and service 440-*o* 2 ms to complete), as well as any services 440 that are operating outside of some threshold (e.g., based on metrics associated with one or more of the services 440). In one example, the trace data may be used to identify that a service 440-*q* associated with investment account balances may take 20 ms, whereas some metrics may provide that a threshold duration for the service 440-*q* may be 10 ms. In such cases, the system may indicate, based on spans included in trace data, that the service 440-*q* is causing latency in the journey 400-*b*. Additionally or alternatively, logs, tags, and other metadata may be collected for each of the services 440 of the journey 400-*b* (e.g., via spans), which may enable the identification of one or more other attributes that describe the functions performed by each service 440 and the identification of a number of errors, delays, or issues, or any combination thereof, for the services 440.

Moreover, the trace data may capture additional user-specific transaction for the journey 400-*b* that may help to identify the user-specific scenario for a user interacting with the application 400-*a*. For example, the trace data (e.g., during the acquisition of the diagnostic information for the services 440 of the journey 400-*b*) may provide information associated with a location of the device 405, the user's total account balances (e.g., for the investment accounts 410 and the banking accounts 415), and a time when the journey 400-*b* was initiated by the device 405, and the trace data may also provide diagnostic information for each of the services 440. The trace data may enable the identification of a number of successful and/or unsuccessful transactions (e.g., based on the diagnostic information for the services 440) associated with respective journeys (and across a relatively large number of users), may be linked to the user-specific information (e.g., the location, account balances, time for each journey). For instance, the diagnostic information and the user-specific information may be captured and stored for substantively real-time analysis, where information may be analyzed for some set of users who may be encountering the same or similar issues when using the application 400-*a*, have similar account balances, and are accessing the application 400-*a* in relatively the same location or region.

As such, a user experience may be identified on a per-journey basis (e.g., for multiple different journey that may be initiated by similar users) to acquire additional business insights into how the user experience may be enhanced. Here, the trace data, including both the diagnostic information and the user-specific transaction information, may provide additional information to determine if there are ways in which the application 400-*a* may be modified, improved, or enhanced for this user and other users like them. Additionally or alternatively, the user-specific transaction information included in the trace data may inform one or more additional products or services (e.g., provided by the financial institution) that may be offered to the user or group of users.

Thus, a trace may be generated for the journey 400-*b* that is initiated by the device 405 (e.g., a mobile device, a personal computer). The journey 400-*b* may be initiated via an application 400-*a* that is based on a microservices architecture, where the journey 400-*b* may be associated with, for example, viewing one or more account balances. As described herein, the trace generated for the journey 400-*b* may include one or more spans, and each span may correspond to at least one service 440 of a set of services (e.g., the set of services 440) that provide functionality to the journey 400-*b* (e.g., as respective components of the application). Based on the generated trace including the one or more spans, both diagnostic information and user-specific transaction information may be collected for the user journey. For example, the diagnostic information may include information associated with a service 440 (e.g., how long services 440-*n*, 440-*p*, and 440-*s* took to complete) and the user-specific transaction information may include information related to the user and/or the transaction for that particular service 440 and journey 400-*b*, such as at least one of a location of the user, a time of day, a type of device 405 used for the transaction, a type of transaction, among other examples.

Figure 5:
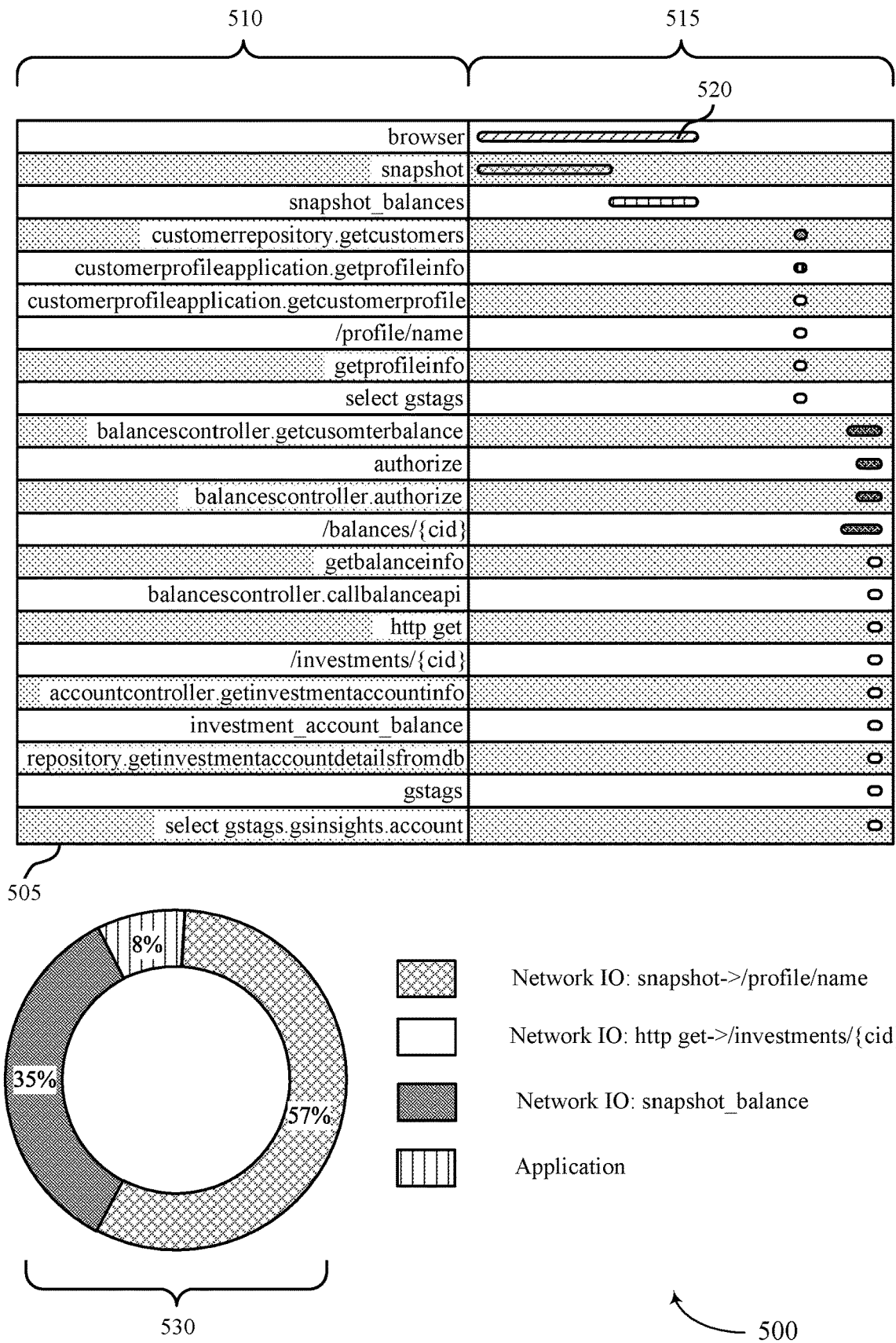
FIG. 5 illustrates an example of a visualization by a system that supports distributed tracing techniques for acquiring business insights in accordance with aspects of the present disclosure.

FIG. 5 illustrates an example of a visualization 500 by a system that supports distributed tracing techniques for acquiring business insights in accordance with aspects of the present disclosure. In some examples, the visualization 500 may be provided by an interface of a device (e.g., a computer, a laptop, a smartphone, a tablet, or other computing system), and may include one or more widgets, graphs, tables, charts, modules, or the like, that visualize trace data acquired through the enhanced distributed tracing techniques described herein. In particular, the visualization 500 may provide a single pane view of traces (e.g., trace data) that are integrated with log data and metric data for a particular user journey, such as the journey 400-*b* described with respect to FIGS. 4A and 4B. For instance, a system may support the customizable customer journey data, which may include trace data for diagnostic information and user-specific transaction information, and the system may support the visualization of the journey information. The visualization 500 may provide a simplified presentation of trace data for identifying various aspects of the journey including issues or delays associated with various services.

In some aspects, the visualization 500 may include a table 505 that includes service information 510 and timing information 515 for each service. Specifically, for a user journey, the service information 510 may illustrate one or more services (e.g., from a set of multiple services) that are included in an application having a service-based or microservices architecture. In addition, each service (e.g., each row) may include corresponding timing information 515 that provides a relative length of time that each service took to complete.

In some examples, the service information 510 and the timing information 515 illustrated by the visualization 500 may correspond to the services 440 described with reference to FIG. 4B. For instance, the service information 510 may correspond to the services (e.g., services 440-*a* through 440-*s*) included in an application for displaying an account "snapshot" as described with reference to FIGS. 4A and 4B. Accordingly, each service may be completed in some amount of time, and the visualization 500 may display, within the timing information 515, an indication 520 of how long each service took to complete. That is, the timing information 515 may include a respective indication 520 for each service. Here, a relatively longer indication 520 may represent relatively more time for a service to complete. Likewise, a relatively shorter indication 520 may represent relatively less time for a service to complete. In some examples, the visualization 500 may enable a compact view of the service information 510 to indicate how long respective services are taking for a journey. Such information may be used by an analytics user (e.g., an information technology professional that has credentials and/or permissions for modifying the application, among other examples) to identify problems or delays during the journey, and may thereby enable the identification of respective services (e.g., microservices) that may be causing the problems or delays. In addition, the visualization 500 may be based on user-specific information that enables information (e.g., service information 510, timing information 515, among other information) to be viewed based on one or more parameters for a particular type of user initiating the journey, a type of device initiating the journey, a location of the device initiating the journey, a time or time range when the journey was initiated, a type of transaction the journey corresponds to, among other examples.

The visualization 500 may provide a single-pane display of the time each service completed during the journey and may provide additional information associated with the services to an analytics user. For example, one or more charts, graphs, widgets, or other displays, may provide further analysis of the trace data, metrics, and logs associated with the user journey. As illustrated, the visualization 500 may include a chart 530 that represents an overall timing of different services (or groups of services) associated with respective aspects of the user journey (e.g., the "snapshot"). Here, some percentage of time for different services or types of services may be categorized and visualized, which may aid in identifying one or more services that may satisfy operational thresholds. For example, the chart 530 may show trending aspects of the user journey, what percentage of time of the user journey was spent in network, in application, transiting across applications, or any combination thereof. In addition, the chart 530 may aid an analytics user in identifying one or more aspects of the user journey that may be enhanced, improved, or modified, based on the journey-specific trace data collected for the services.

The charts, graphs, widgets, or other displays may be displayed to an analytics user in approximate real time. This may allow the analytics user to analyze the diagnostic or user-specific transactional information in approximate real time and similarly make adjustments or modification to an application in approximate real time. For example, if a customer begins a user journey associated with opening an account, and a service fails or takes longer than a predetermined operational threshold, the table 505 may be displayed to the analytics user with substantially real-time information (e.g., as the error occurs). This may allow the analytics user to remedy the problem in approximate real time, such as accounting for a time delay if the operation takes longer than a predetermined threshold, or sending a link to begin a new journey to open an account again if the first journey fails for any reason.

Thus, the visualization 500 may include one or more views that provide traces, metrics, and logs for specific business transactions, where the traces, metrics, and logs may be based on collecting both diagnostic information and customer-specific transaction information and the view may be provided by a device in a single pane view. Other views different from the examples described herein may be possible and may provide an efficient display of information for an application. The visualization 500 may enable the identification of one or more issues (e.g., proactively or reactively) based on trace data generated for a number of services. In some examples, the visualization 500 may be modified using one or more editing functionalities, and the system may support one or more search capabilities that may be tailored to a customer journey.

Figure 6:
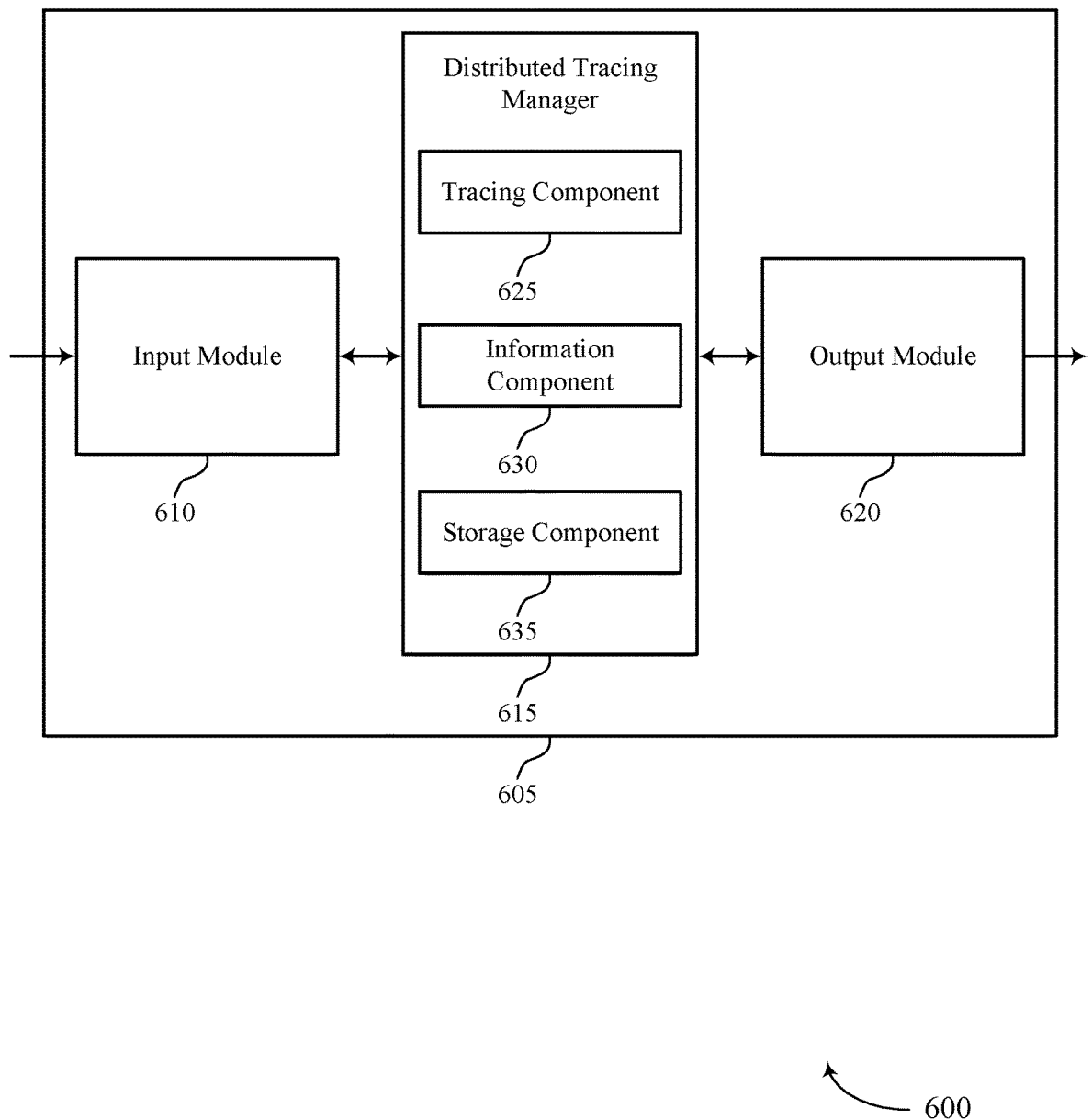
FIG. 6 shows a block diagram of a distributed tracing component that supports distributed tracing techniques for acquiring business insights in accordance with aspects of the present disclosure.

FIG. 6 shows a block diagram 600 of a system 605 that supports distributed tracing techniques for acquiring business insights in accordance with aspects of the present disclosure. The system 605 may include one or more devices, or system 605 may be an example of aspects of a device, as described with reference to FIGS. 1 through 5. The system 605, or various components thereof, may be an example of means for performing various aspects of distributed tracing techniques for acquiring business insights as described herein. For example, the system 605 may include an input module 610, a distributed tracing manager 615, and an output module 620. In some cases, the system 605 may be an example of a user terminal, a database server, or a system containing multiple computing devices, among other examples. The distributed tracing manager 615 may be an example of aspects of the distributed tracing manager 720 described with reference to FIG. 7. In some examples, the distributed tracing manager 615 may also include a tracing component 625, an information component 630, and a storage component 635.

The distributed tracing manager 615 and/or at least some of its various sub-components may be implemented in hardware, software executed by a processor, firmware, or any combination thereof. If implemented in software executed by a processor, the functions of the distributed tracing manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The distributed tracing manager 615 and/or at least some of its various sub-components may be physically located at various positions, including being distributed such that portions of functions are implemented al different physical locations by one or more physical devices. In some examples, the distributed tracing manager 615 and/or at least some of its various sub-components may be a separate and distinct component in accordance with various aspects of the present disclosure. In other examples, the distributed tracing manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

The tracing component 625 may be configured as or otherwise support a means for generating, for a user journey initiated by a source device, trace data for one or more spans corresponding to respective portions of the user journey, wherein each span of the one or more spans is associated with a respective service of a plurality of services. The information component 630 may be configured as or otherwise support a means for collecting diagnostic information and user-specific transaction information associated with the user journey based at least in part on the trace data, wherein the diagnostic information and the user-specific transaction information is collected for each service of the plurality of services. The storage component 635 may be configured as or otherwise support a means for storing the diagnostic information and the user-specific transaction information based at least in part on generating the trace data for the user journey. In some examples, the user-specific transaction information comprises a location of the source device, a type of transaction, a type of request, a type of the source device, user account information, a user classification, or any combination thereof.

By including or configuring the distributed tracing manager 615 in accordance with examples as described herein, the system 605 (e.g., including at least one processor controlling or otherwise coupled to the input module 610, the tracing component 625, the output module 620, or a combination thereof) may support techniques for efficient collection of information used for business insights, technical diagnostics, and system improvements. For example, the techniques described herein may enable the system 605 to perform the collection of both diagnostic information and user-specific transaction information (e.g., a location of the user, a type of user, or the like) for a user journey and using a single process or scheme that collects the diagnostic information. More specifically, a configuration of the distributed tracing manager 615 may enable for the collection of user-specific transaction information for multiple services that are associated with the user journey, where the user-specific transaction information may be acquired using the same techniques and processes used to acquire diagnostic information (e.g., as part of a distributed tracing process) for each of the services. The configuration of the distributed tracing manager 615 may reduce complexity in the acquisition of user information associated with each service by eliminating multiple additional applications, schemes, or techniques that may otherwise be used for obtaining the user-specific transaction information. That is, the configuration of the distributed tracing manager 615 may enable the user-specific information to be acquired at the same time as information that forms a trace for multiple services. Further, the distributed tracing manager 615 may be configured to obtain information for one or more respective user journeys, thereby providing a relatively complete understanding of how each service may affect a user throughout a respective journey, while also streamlining the acquisition of data that may be used for further system, process, and business enhancements for customers.

Figure 7:
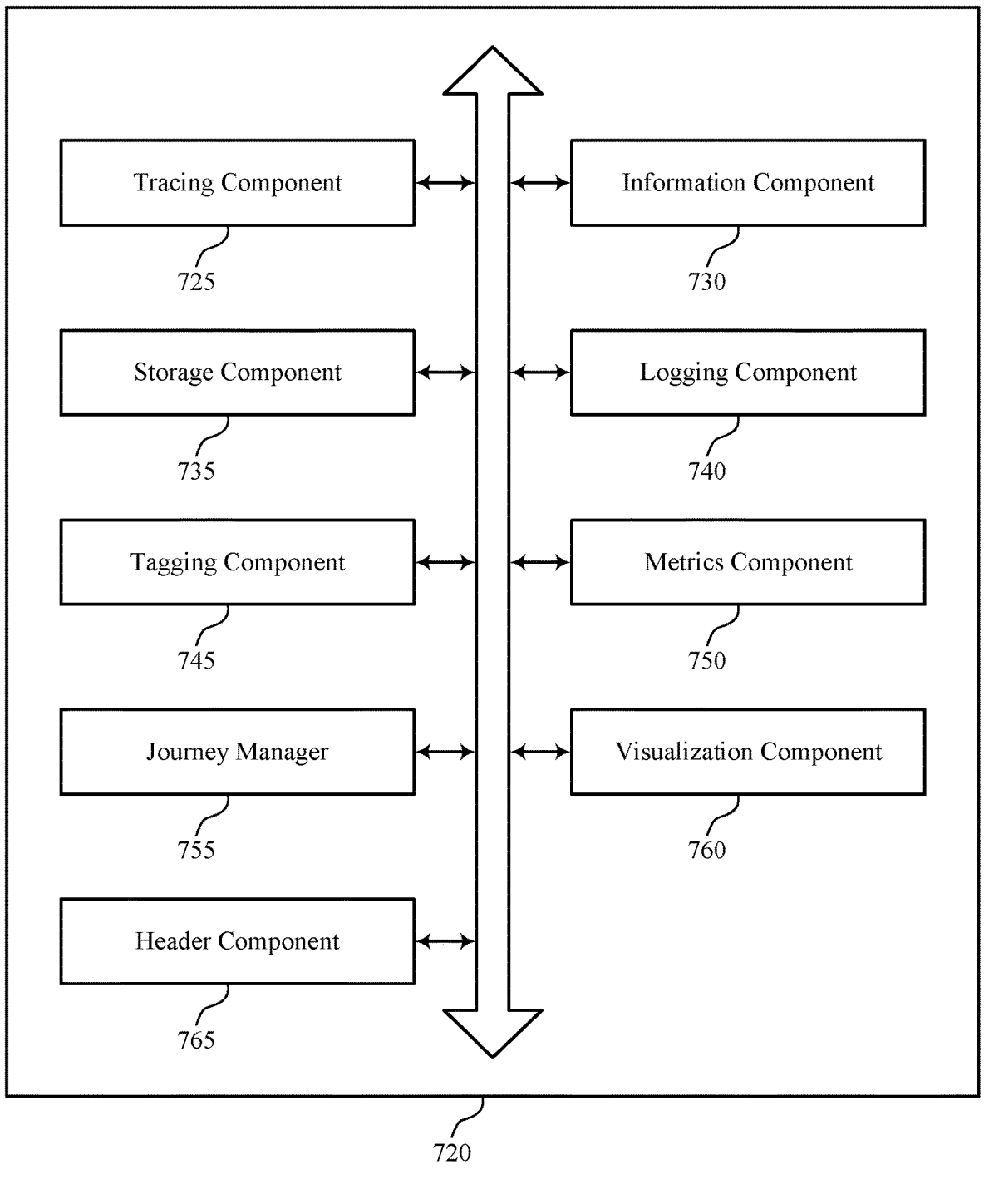
FIG. 7 shows a diagram of a distributed tracing manager that supports distributed tracing techniques for acquiring business insights in accordance with aspects of the present disclosure.

FIG. 7 shows a diagram 700 of a distributed tracing manager 720 that supports distributed tracing techniques for acquiring business insights in accordance with aspects of the present disclosure. The distributed tracing manager 720 may be an example of aspects of a distributed tracing manager 615 as described with reference to FIG. 6. The distributed tracing manager 720, or various components thereof, may be an example of means for performing various aspects of distributed tracing techniques for acquiring business insights as described herein. For example, the distributed tracing manager 720 may include a tracing component 725, an information component 730, a storage component 735, a logging component 740, a tagging component 745, a metrics component 750, a journey manager 755, a visualization component 760, a header component 765, or any combination thereof. Each of these components may communicate, directly or indirectly, with one another (e.g., via one or more buses).

The tracing component 725 may be configured as or otherwise support a means for generating, for a user journey initiated by a source device, trace data for one or more spans corresponding to respective portions of the user journey, wherein each span of the one or more spans is associated with a respective service of a plurality of services. The information component 730 may be configured as or otherwise support a means for collecting diagnostic information and user-specific transaction information associated with the user journey based at least in part on the trace data, wherein the diagnostic information and the user-specific transaction information is collected for each service of the plurality of services. The storage component 735 may be configured as or otherwise support a means for storing the diagnostic information and the user-specific transaction information based at least in part on generating the trace data for the user journey.

In some examples, to support collecting the diagnostic information and the user-specific transaction information, the information component 730 may be configured as or otherwise support a means for collecting the diagnostic information and the user-specific transaction information based at least in part on one or more code wrappers applied to a distributed tracing system, the one or more code wrappers being configured to collect at least the user-specific transaction information for the plurality of services.

In some examples, to support generating the trace data, the tracing component 725 may be configured as or otherwise support a means for generating trace context information for the one or more spans, the trace context information associated with the diagnostic information and the user-specific transaction information.

In some examples, the journey manager 755 may be configured as or otherwise support a means for identifying, using the trace context information, one or more unsuccessful processes of the user journey based at least in part on the user-specific transaction information.

In some examples, the journey manager 755 may be configured as or otherwise support a means for identifying, using the trace context information, one or more successful processes of the user journey based at least in part on the user-specific transaction information.

In some examples, the header component 765 may be configured as or otherwise support a means for propagating the trace context information across the plurality of services based at least in part on one or more trace headers, wherein the trace context information is propagated in accordance with, for example, a b3 propagation scheme.

In some examples, the logging component 740 may be configured as or otherwise support a means for generating one or more logs for the user-specific transaction information of the user journey, wherein the each log of the one or more logs correspond to a set of transactions occurring at a point in time. In some examples, the tagging component 745 may be configured as or otherwise support a means for generating one or more tags for the user-specific transaction information of the user journey, wherein each tag of the one or more tags is associated with a respective log of the one or more logs using key value pairing.

In some examples, the storage component 735 may be configured as or otherwise support a means for storing the one or more logs in a first database comprising raw data storage. In some examples, the storage component 735 may be configured as or otherwise support a means for storing the one or more tags in a second database different than the first database, wherein the second database comprises a relational database.

In some examples, the metrics component 750 may be configured as or otherwise support a means for identifying a set of metrics associated with at least one service of the plurality of services, wherein the set of metrics comprises one or more threshold values corresponding to a service level objective, a service level indicator, a service level agreement, or any combination thereof. In some examples, the journey manager 755 may be configured as or otherwise support a means for generating journey information for the user journey based at least in part on the diagnostic information, the user-specific transaction information, and the set of metrics. In some examples, the set of metrics includes one or more predetermined values, one or more measurements over a time period, or any combination thereof. In some examples, the storage component 735 may be configured as or otherwise support a means for storing the trace data in a columnar database based at least in part on generating the trace data.

In some examples, the visualization component 760 may be configured as or otherwise support a means for generating a visualization of the user journey based at least in part on the trace data, one or more logs for the user-specific transaction information, and a set of metrics associated with at least one service of the plurality of services for the user journey, wherein the visualization is generated based at least in part on a transaction type, or a portion of the user journey, or any combination thereof. In some examples, the user-specific transaction information comprises a location of the source device, a type of transaction, a type of request, a type of the source device, user account information, a user classification, or any combination thereof.

Figure 8:
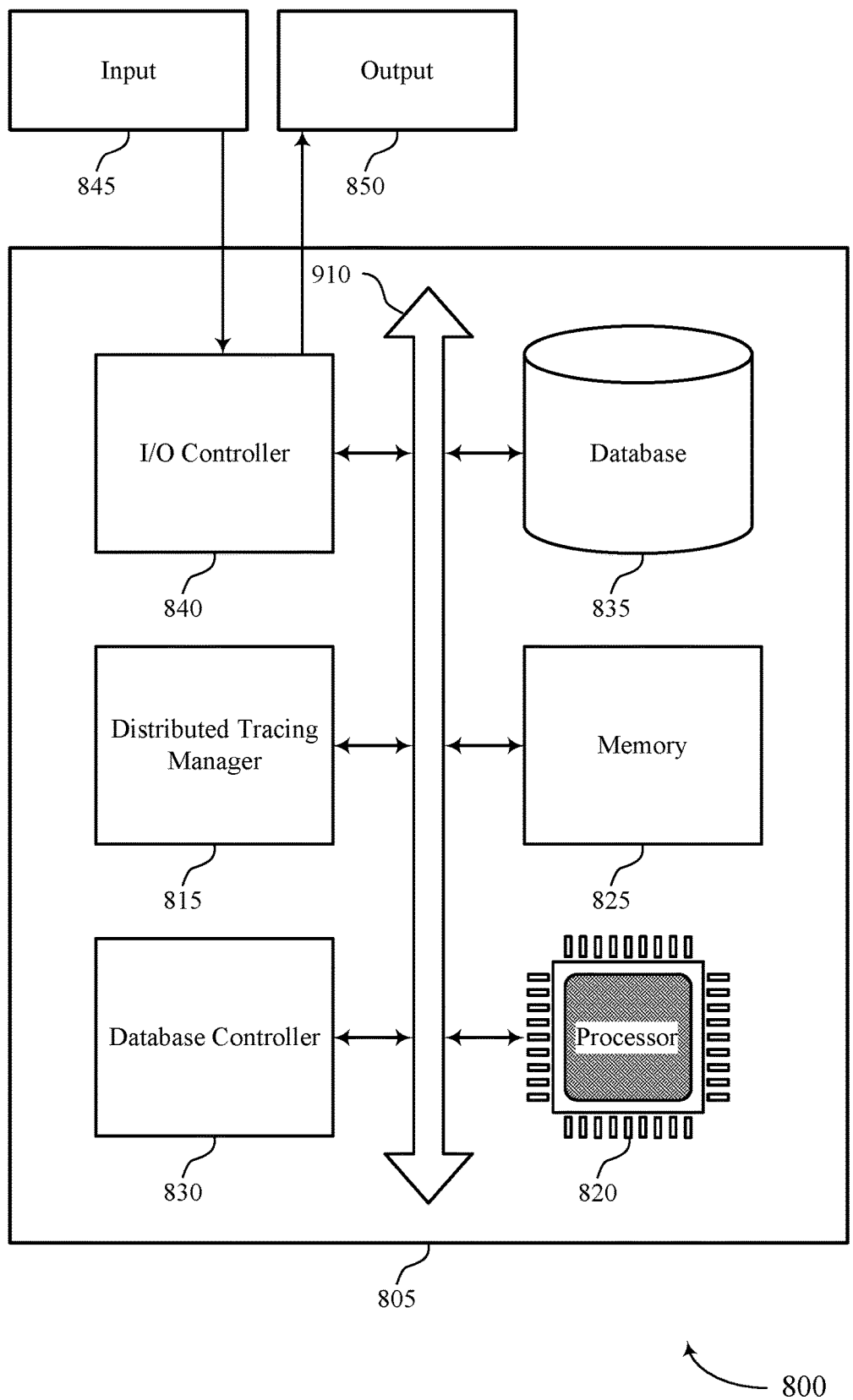
FIG. 8 shows a diagram of an environment including a system that supports distributed tracing techniques for acquiring business insights in accordance with aspects of the present disclosure.

FIG. 8 shows a diagram of an environment 800 including a system 805 that supports distributed tracing techniques for acquiring business insights in accordance with aspects of the present disclosure. The system 805 may be an example of or include the components of system 110 as described herein, e.g., with reference to FIG. 1. The system 805 may include components for bi-directional data communications including components for transmitting and receiving communications, including a distributed tracing manager 815, a processor 820, memory 825, a database controller 830, a database 835, and an I/O controller 840. The functionality of the above components may be performed at separate servers, user devices, or databases in system 805, or may be performed by different components of one or more same servers, user devices, or databases. These components may be in electronic communication or otherwise coupled (e.g., operatively, communicatively, functionally, electronically, electrically) via one or more busses (e.g., bus 810).

The distributed tracing manager 815 may be configured as or otherwise support a means for generating, for a user journey initiating by a source device (e.g., a user device), trace data for one or more spans corresponding to respective portions of the user journey, wherein each span of the one or more spans is associated with a respective service of a plurality of services. The distributed tracing manager 815 may be configured as or otherwise support a means for collecting diagnostic information and user-specific transaction information associated with the user journey based at least in part on the trace data, wherein the diagnostic information and the user-specific transaction information is collected for each service of the plurality of services. The distributed tracing manager 815 may be configured as or otherwise support a means for storing the diagnostic information and the user-specific transaction information based at least in part on generating the trace data for the user journey The processor 820 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 820 may be configured to operate a memory array using a memory controller. In some other cases, a memory controller may be integrated into the processor 820. The processor 820 may be configured to execute computer-readable instructions stored in memory 825 to perform various functions (e.g., functions or tasks supporting distributed tracing techniques for acquiring business insights).

Memory 825 may include random-access memory (RAM) and read-only memory (ROM). The memory 825 may store computer-readable, computer-executable software including instructions that, when executed, cause the processor 820 to perform various functions described herein. In some cases, the memory 825 may contain, among other things, a basic input/output system (BIOS) which may control basic hardware and/or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database, among other examples.

The I/O controller 810 may manage input signals 845 and output signals 850 for the system 805. The I/O controller 810 may also manage peripherals not integrated into the system 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor. In some examples, a user may interact with the system 805 via the controller 810 or via hardware components controlled by the I/O controller 810.

Figure 9:
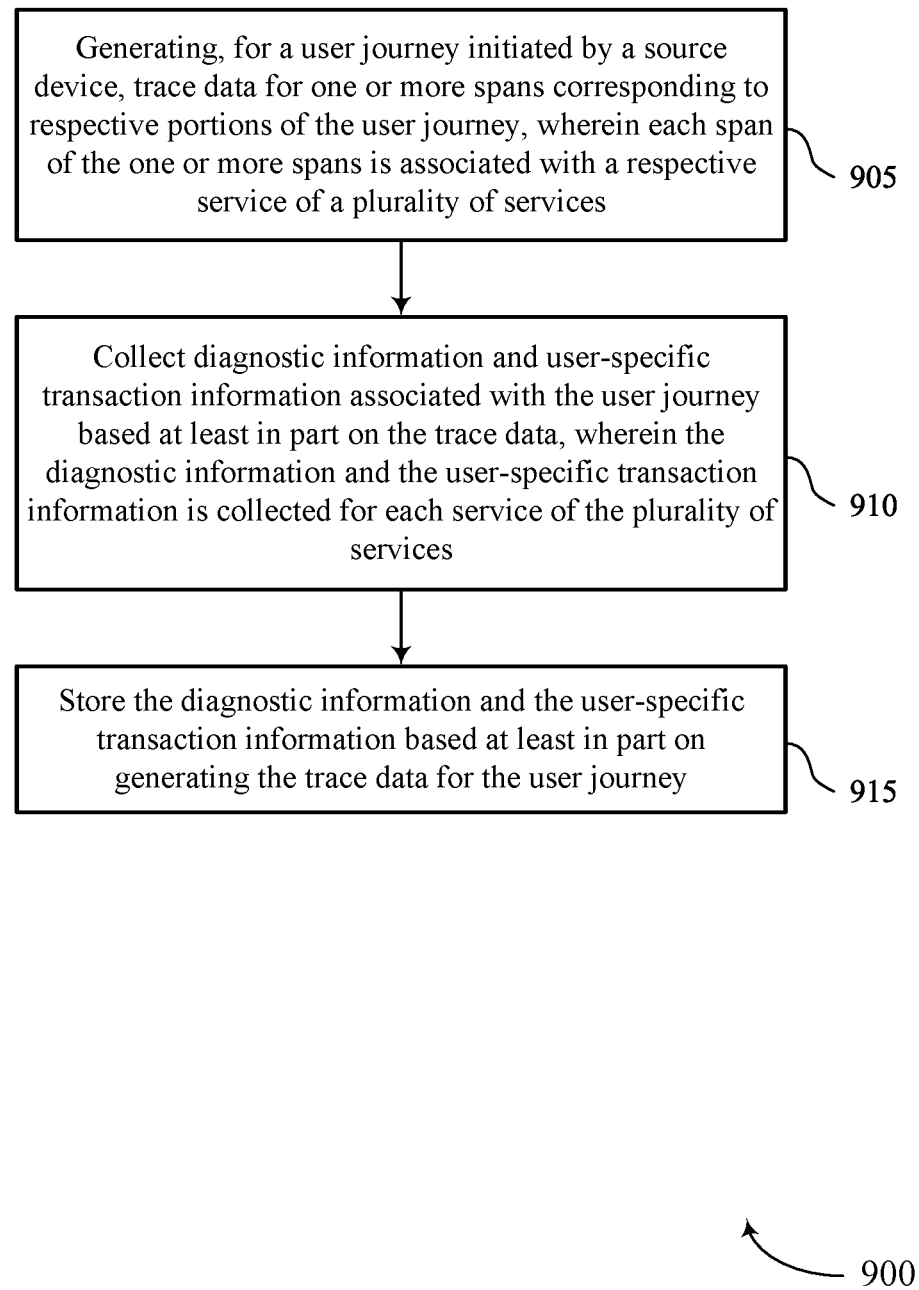
FIGS. 9 through 11 show flowcharts illustrating methods that support distributed tracing techniques for acquiring business insights in accordance with aspects of the present disclosure.

FIG. 9 shows a flowchart illustrating a method 900 that supports distributed tracing techniques for acquiring business insights in accordance with aspects of the present disclosure. The operations of the method 900 may be implemented by a device or its components as described herein. For example, the operations of the method 900 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 905, the method may include generating, for a user journey initiated by a source device, trace data for one or more spans corresponding to respective portions of the user journey, wherein each span of the one or more spans is associated with a respective service of a plurality of services. The operations of 905 may be performed in accordance with examples as disclosed herein. In some examples, aspects of the operations of 905 may be performed by a tracing component 625 as described with reference to FIG. 6.

At 910, the method may include collecting diagnostic information and user-specific transaction information associated with the user journey based at least in part on the trace data, wherein the diagnostic information and the user-specific transaction information is collected for each service of the plurality of services. The operations of 910 may be performed in accordance with examples as disclosed herein. In some examples, aspects of the operations of 910 may be performed by an information component 630 as described with reference to FIG. 6.

At 915, the method may include storing the diagnostic information and the user-specific transaction information based at least in part on generating the trace data for the user journey. The operations of 915 may be performed in accordance with examples as disclosed herein. In some examples, aspects of the operations of 915 may be performed by a storage component 635 as described with reference to FIG. 6.

In some examples, an apparatus as described herein may perform a method or methods, such as the method 900. The apparatus may include, features, circuitry, means, or instructions (e.g., a non-transitory computer-readable medium storing instructions executable by a processor) for generating, for a user journey initiated by a source device, trace data for one or more spans corresponding to respective portions of the user journey, wherein each span of the one or more spans is associated with a respective service of a plurality of services, collecting diagnostic information and user-specific transaction information associated with the user journey based at least in part on the trace data, wherein the diagnostic information and the user-specific transaction information is collected for each service of the plurality of services, and storing the diagnostic information and the user-specific transaction information based at least in part on generating the trace data for the user journey.

In some examples of the method 900 and the apparatus described herein, collecting the diagnostic information and the user-specific transaction information may include operations, features, circuitry, logic, means, or instructions for collecting the diagnostic information and the user-specific transaction information based at least in part on one or more code wrappers applied to a distributed tracing system, the one or more code wrappers being configured to collect at least the user-specific transaction information for the plurality of services.

In some examples of the method 900 and the apparatus described herein, generating the trace data may include operations, features, circuitry, logic, means, or instructions for generating trace context information for the one or more spans, the trace context information associated with the diagnostic information and the user-specific transaction information.

Some examples of the method 900 and the apparatus described herein may further include operations, features, means, or instructions for identifying, using the trace context information, one or more unsuccessful processes of the user journey based at least in part on the user-specific transaction information.

Some examples of the method 900 and the apparatus described herein may further include operations, features, means, or instructions for identifying, using the trace context information, one or more successful processes of the user journey based at least in part on the user-specific transaction information.

Some examples of the method 900 and the apparatus described herein may further include operations, features, means, or instructions for propagating the trace context information across the plurality of services based at least in part on one or more trace headers, wherein the trace context information may be propagated in accordance with a B3 propagation scheme.

Some examples of the method 900 and the apparatus described herein may further include operations, features, means, or instructions for generating one or more logs for the user-specific transaction information of the user journey, wherein the each log of the one or more logs correspond to a set of transactions occurring at a point in time and generating one or more tags for the user-specific transaction information of the user journey, wherein each tag of the one or more tags may be associated with a respective log of the one or more logs using key value pairing.

Some examples of the method 900 and the apparatus described herein may further include operations, features, means, or instructions for storing the one or more logs in a first database comprising raw data storage and storing the one or more tags in a second database different than the first database, wherein the second database comprises a relational database.

Some examples of the method 900 and the apparatus described herein may further include operations, features, means, or instructions for identifying a set of metrics associated with at least one service of the plurality of services, wherein the set of metrics comprises one or more threshold values corresponding to a service level objective, a service level indicator, a service level agreement, or any combination thereof and generating journey information for the user journey based at least in part on the diagnostic information, the user-specific transaction information, and the set of metrics.

In some examples of the method 900 and the apparatus described herein, the set of metrics includes one or more predetermined values, one or more measurements over a time period, or any combination thereof.

Some examples of the method 900 and the apparatus described herein may further include operations, features, means, or instructions for storing the trace data in a columnar database based at least in part on generating the trace data.

Some examples of the method 900 and the apparatus described herein may further include operations, features, means, or instructions for generating a visualization of the user journey based at least in part on the trace data, one or more logs for the user-specific transaction information, and a set of metrics associated with at least one service of the plurality of services for the user journey, wherein the visualization may be generated based at least in part on a transaction type, or a portion of the user journey, or any combination thereof.

In some examples of the method 900 and the apparatus described herein, the user-specific transaction information comprises a location of the source device, a type of transaction, a type of request, a type of the source device, user account information, a user classification, or any combination thereof.

Figure 10:
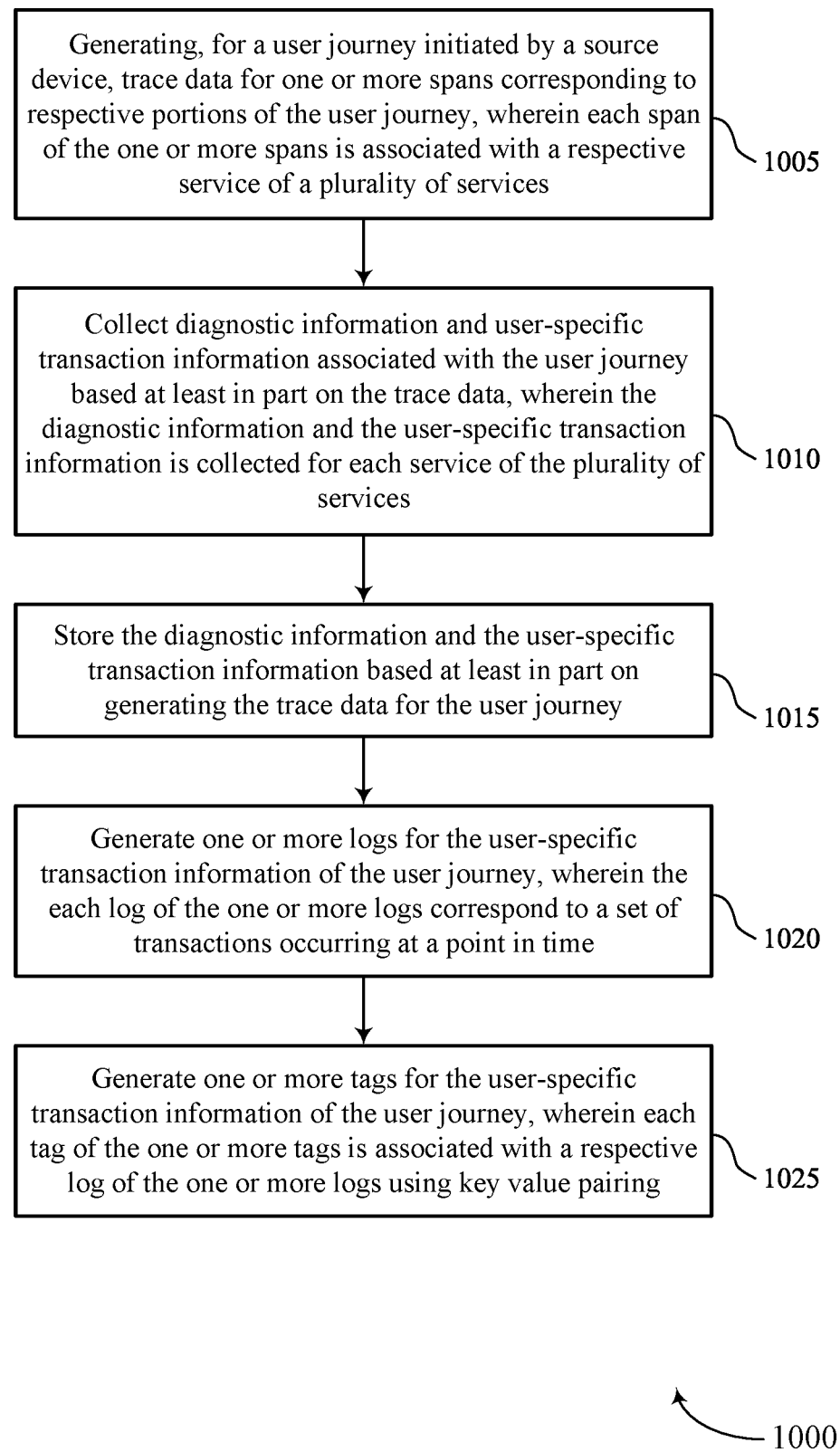

FIG. 10 shows a flowchart illustrating a method 1000 that supports distributed tracing techniques for acquiring business insights in accordance with aspects of the present disclosure. The operations of the method 1000 may be implemented by a device or its components as described herein. For example, the operations of the method 1000 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1005, the method may include generating, for a user journey initiated by a source device, trace data for one or more spans corresponding to respective portions of the user journey, wherein each span of the one or more spans is associated with a respective service of a plurality of services. The operations of 1005 may be performed in accordance with examples as disclosed herein. In some examples, aspects of the operations of 1005 may be performed by a tracing component 625 as described with reference to FIG. 6.

At 1010, the method may include collecting diagnostic information and user-specific transaction information associated with the user journey based at least in part on the trace data, wherein the diagnostic information and the user-specific transaction information is collected for each service of the plurality of services. The operations of 1010 may be performed in accordance with examples as disclosed herein. In some examples, aspects of the operations of 1010 may be performed by an information component 630 as described with reference to FIG. 6.

At 1015, the method may include storing the diagnostic information and the user-specific transaction information based at least in part on generating the trace data for the user journey. The operations of 1015 may be performed in accordance with examples as disclosed herein. In some examples, aspects of the operations of 1015 may be performed by a storage component 635 as described with reference to FIG. 6.

At 1020, the method may include generating one or more logs for the user-specific transaction information of the user journey, wherein the each log of the one or more logs correspond to a set of transactions occurring at a point in time. The operations of 1020 may be performed in accordance with examples as disclosed herein. In some examples, aspects of the operations of 1020 may be performed by a logging component 740 as described with reference to FIG. 7.

At 1025, the method may include generating one or more tags for the user-specific transaction information of the user journey, wherein each tag of the one or more tags is associated with a respective log of the one or more logs using key value pairing. The operations of 1025 may be performed in accordance with examples as disclosed herein. In some examples, aspects of the operations of 1025 may be performed by a tagging component 745 as described with reference to FIG. 7.

Figure 11:
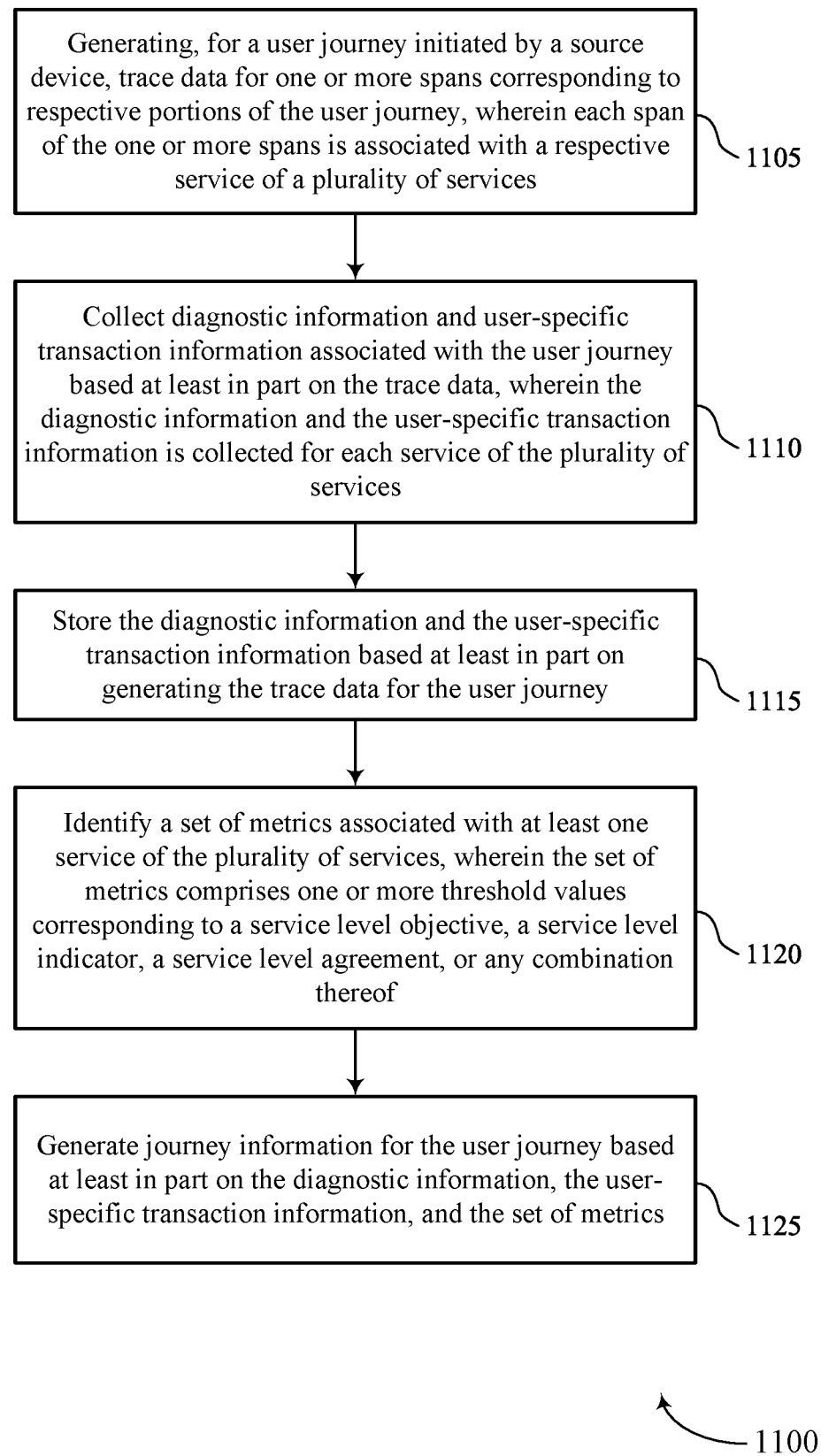

FIG. 11 shows a flowchart illustrating a method 1100 that supports distributed tracing techniques for acquiring business insights in accordance with aspects of the present disclosure. The operations of the method 1100 may be implemented by a device or its components as described herein. For example, the operations of the method 1100 may be performed by a device as described with reference to FIGS. 1 through 7. In some examples, a device may execute a set of instructions to control the functional elements of the device to perform the described functions. Additionally or alternatively, the device may perform aspects of the described functions using special-purpose hardware.

At 1105, the method may include generating, for a user journey initiated by a source device, trace data for one or more spans corresponding to respective portions of the user journey, wherein each span of the one or more spans is associated with a respective service of a plurality of services. The operations of 1105 may be performed in accordance with examples as disclosed herein. In some examples, aspects of the operations of 1105 may be performed by a tracing component 625 as described with reference to FIG. 6.

At 1110, the method may include collecting diagnostic information and user-specific transaction information associated with the user journey based at least in part on the trace data, wherein the diagnostic information and the user-specific transaction information is collected for each service of the plurality of services. The operations of 1110 may be performed in accordance with examples as disclosed herein. In some examples, aspects of the operations of 1110 may be performed by an information component 630 as described with reference to FIG. 6.

At 1115, the method may include storing the diagnostic information and the user-specific transaction information based at least in part on generating the trace data for the user journey. The operations of 1115 may be performed in accordance with examples as disclosed herein. In some examples, aspects of the operations of 1115 may be performed by a storage component 635 as described with reference to FIG. 6.

At 1120, the method may include identifying a set of metrics associated with at least one service of the plurality of services, wherein the set of metrics comprises one or more threshold values corresponding to a service level objective, a service level indicator, a service level agreement, or any combination thereof. The operations of 1120 may be performed in accordance with examples as disclosed herein. In some examples, aspects of the operations of 1120 may be performed by a metrics component 750 as described with reference to FIG. 7.

At 1125, the method may include generating journey information for the user journey based at least in part on the diagnostic information, the user-specific transaction information, and the set of metrics. The operations of 1125 may be performed in accordance with examples as disclosed herein. In some examples, aspects of the operations of 1125 may be performed by a journey manager 755 as described with reference to FIG. 7.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   generating, for a user journey initiated by a source device via an application, trace data for one or more spans corresponding to respective portions of the user journey, wherein each span of the one or more spans is associated with a respective service of a plurality of services of the application;
   collecting diagnostic information and user-specific transaction information associated with the user journey based at least in part on the trace data, wherein the diagnostic information and the user-specific transaction information is collected for each service of the plurality of services, wherein the user-specific transaction information comprises an account balance;
   generating trace context information for the one or more spans, the trace context information associated with the diagnostic information and the user-specific transaction information;
   propagating the trace context information across the plurality of services based at least in part on one or more trace headers, wherein the trace context information is propagated in accordance with a B3 propagation scheme;
   storing the diagnostic information and the user-specific transaction information based at least in part on generating the trace data for the user journey, wherein one or more logs associated with the user-specific transaction information are stored in a first database and one or more tags associated with the one or more logs are stored in a second database, and wherein the second database is indexed according to a hash index associated with the user-specific transaction information; and
   retrieving, as part of a troubleshooting operation, the diagnostic information using the hash index and retrieving the user-specific transaction information using the hash index in response to determining that the account balance exceeds a minimum account balance threshold, wherein retrieving the diagnostic information and the user-specific transaction information and collecting the diagnostic information and the user-specific transaction information occurs in approximate real time.

2. The method of claim 1, wherein collecting the diagnostic information and the user-specific transaction information comprises:
   collecting the diagnostic information and the user-specific transaction information based at least in part on one or more code wrappers applied to a distributed tracing system, the one or more code wrappers being configured to collect at least the user-specific transaction information for the plurality of services.

3. The method of claim 1, further comprising:
   identifying, using the trace context information, one or more unsuccessful processes of the user journey based at least in part on the user-specific transaction information.

4. The method of claim 1, further comprising:
   identifying, using the trace context information, one or more successful processes of the user journey based at least in part on the user-specific transaction information.

5. The method of claim 1, further comprising:
   generating the one or more logs for the user-specific transaction information of the user journey, wherein each log of the one or more logs correspond to a set of transactions occurring at a point in time; and
   generating the one or more tags for the user-specific transaction information of the user journey, wherein each tag of the one or more tags is associated with a respective log of the one or more logs using key value pairing, the hash index based at least in part on the key value pairing.

6. The method of claim 5, further comprising:
   storing the one or more logs in the first database comprising raw data storage; and
   storing the one or more tags in the second database different than the first database, wherein the second database comprises a relational database.

7. The method of claim 1, further comprising:
   identifying a set of metrics associated with at least one service of the plurality of services, wherein the set of metrics comprises one or more threshold values corresponding to a service level objective, a service level indicator, a service level agreement, or any combination thereof; and
   generating journey information for the user journey based at least in part on the diagnostic information, the user-specific transaction information, and the set of metrics.

8. The method of claim 7, wherein the set of metrics includes one or more predetermined values, one or more measurements over a time period, or any combination thereof.

9. The method of claim 1, further comprising:
   storing the trace data in a columnar database based at least in part on generating the trace data.

10. The method of claim 1, further comprising:
    generating a visualization of the user journey based at least in part on the trace data, the one or more logs for the user-specific transaction information, and a set of metrics associated with at least one service of the plurality of services for the user journey, wherein the visualization is generated based at least in part on a transaction type, or a portion of the user journey, or any combination thereof.

11. The method of claim 1, wherein the user-specific transaction information comprises a location of the source device, a type of transaction, a type of request, a type of the source device, user account information, a user classification, or any combination thereof.

12. An apparatus, comprising:
one or more processors;
one or more memories coupled with the one or more processors; and
instructions stored in the one or more memories and executable by the one or more processors to cause the apparatus to:
  generate, for a user journey initiated by a source device via an application, trace data for one or more spans corresponding to respective portions of the user journey, wherein each span of the one or more spans is associated with a respective service of a plurality of services of the application;
  collect diagnostic information and user-specific transaction information associated with the user journey based at least in part on the trace data, wherein the diagnostic information and the user-specific transaction information is collected for each service of the plurality of services, wherein the user-specific transaction information comprises an account balance;
  generate trace context information for the one or more spans, the trace context information associated with the diagnostic information and the user-specific transaction information;
  propagate the trace context information across the plurality of services based at least in part on one or more trace headers, wherein the trace context information is propagated in accordance with a B3 propagation scheme;
  store the diagnostic information and the user-specific transaction information based at least in part on generating the trace data for the user journey, wherein one or more logs associated with the user-specific transaction information are stored in a first database and one or more tags associated with the one or more logs are stored in a second database, and wherein the second database is indexed according to a hash index associated with the user-specific transaction information; and
  retrieve, as part of a troubleshooting operation, the diagnostic information using the hash index and retrieve the user-specific transaction information using the hash index in response to determining that the account balance exceeds a minimum account balance threshold, wherein retrieving the diagnostic information and the user-specific transaction information and collecting the diagnostic information and the user-specific transaction information occurs in approximate real time.

13. The apparatus of claim 12, wherein the instructions to collect the diagnostic information and the user-specific transaction information are executable by the one or more processors to cause the apparatus to:
  collect the diagnostic information and the user-specific transaction information based at least in part on one or more code wrappers applied to a distributed tracing system, the one or more code wrappers being configured to collect at least the user-specific transaction information for the plurality of services.

14. The apparatus of claim 12, wherein the instructions to generate the trace data are executable by the one or more processors to cause the apparatus to:
  identify, using the trace context information, one or more unsuccessful processes of the user journey based at least in part on the user-specific transaction information; and
  identify, using the trace context information, one or more successful processes of the user journey based at least in part on the user-specific transaction information.

15. The apparatus of claim 12, wherein the instructions are further executable by the one or more processors to cause the apparatus to:
  generate the one or more logs for the user-specific transaction information of the user journey, wherein each log of the one or more logs correspond to a set of transactions occurring at a point in time; and
  generate the one or more tags for the user-specific transaction information of the user journey, wherein each tag of the one or more tags is associated with a respective log of the one or more logs using key value pairing, the hash index based at least in part on the key value pairing.

16. The apparatus of claim 12, wherein the instructions are further executable by the one or more processors to cause the apparatus to:
  identify a set of metrics associated with at least one service of the plurality of services, wherein the set of metrics comprises one or more threshold values corresponding to a service level objective, a service level indicator, a service level agreement, or any combination thereof; and
  generate journey information for the user journey based at least in part on the diagnostic information, the user-specific transaction information, and the set of metrics, wherein the set of metrics includes one or more predetermined values, one or more measurements over a time period, or any combination thereof.

17. The apparatus of claim 12, wherein the instructions are further executable by the one or more processors to cause the apparatus to:
  generate a visualization of the user journey based at least in part on the trace data, the one or more logs for the user-specific transaction information, and a set of metrics associated with at least one service of the plurality of services for the user journey, wherein the visualization is generated based at least in part on a transaction type, or a portion of the user journey, or any combination thereof.

18. A non-transitory computer-readable medium storing code, the code comprising instructions executable by one or more processors to:
  generate, for a user journey initiated by a source device via an application, trace data for one or more spans corresponding to respective portions of the user journey, wherein each span of the one or more spans is associated with a respective service of a plurality of services of the application;
  collect diagnostic information and user-specific transaction information associated with the user journey based at least in part on the trace data, wherein the diagnostic information and the user-specific transaction information is collected for each service of the plurality of services, wherein the user-specific transaction information comprises an account balance;
  generate trace context information for the one or more spans, the trace context information associated with the diagnostic information and the user-specific transaction information;
  propagate the trace context information across the plurality of services based at least in part on one or more trace headers, wherein the trace context information is propagated in accordance with a B3 propagation scheme;

store the diagnostic information and the user-specific transaction information based at least in part on generating the trace data for the user journey, wherein one or more logs associated with the user-specific transaction information are stored in a first database and one or more tags associated with the one or more logs are stored in a second database, and wherein the second database is indexed according to a hash index associated with the user-specific transaction information; and retrieve, as part of a troubleshooting operation, the diagnostic information using the hash index and retrieve the user-specific transaction information using the hash index in response to determining that the account balance exceeds a minimum account balance threshold, wherein retrieving the diagnostic information and the user-specific transaction information and collecting the diagnostic information and the user-specific transaction information occurs in approximate real time.

* * * * *